US010909004B1

(12) United States Patent
Chen et al.

(10) Patent No.: US 10,909,004 B1
(45) Date of Patent: Feb. 2, 2021

(54) ONLINE SYSTEM CHECKPOINT RECOVERY ORCHESTRATION

(71) Applicant: EMC IP Holding Company LLC, Hopkinton, MA (US)

(72) Inventors: Xiangping Chen, Sherborn, MA (US); Anton Kucherov, Dudley, MA (US); Zvi Schneider, Hod Hasharon (IL); Ying Hu, Northborough, MA (US); Felix Shvaiger, Brighton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 16/511,676

(22) Filed: Jul. 15, 2019

Related U.S. Application Data

(63) Continuation of application No. 15/499,935, filed on Apr. 28, 2017, now Pat. No. 10,402,283.

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 2201/805* (2013.01); *G06F 2201/82* (2013.01)

(58) Field of Classification Search
CPC ............... G06F 11/1469; G06F 11/1451
See application file for complete search history.

(56) References Cited

U.S. PATENT DOCUMENTS

| 6,052,799 A | * | 4/2000 | Li ................... G06F 11/1435 |
| | | | 711/114 |
| 7,475,124 B2 | | 1/2009 | Jiang et al. |
| 7,818,535 B1 | | 10/2010 | Bono et al. |
| 7,996,636 B1 | | 8/2011 | Prakash et al. |
| 8,327,103 B1 | | 12/2012 | Can et al. |
| 8,380,928 B1 | | 2/2013 | Chen et al. |
| 8,429,346 B1 | | 4/2013 | Chen et al. |
| 8,515,911 B1 | | 8/2013 | Zhou et al. |

(Continued)

OTHER PUBLICATIONS

U.S. Appl. No. 15/085,188, filed Mar. 30, 2016, Meiri et al.
(Continued)

*Primary Examiner* — Katherine Lin
(74) *Attorney, Agent, or Firm* — Daly, Crowley Mofford & Durkee, LLP

(57) ABSTRACT

An aspect includes generating a checkpoint for a storage system containing an image for a point in time. An aspect also includes storing, in a reserved area, volume configuration data corresponding to volumes for the point in time, layers of metadata and physical data for the point in time. An aspect further includes creating consistent snapshots for the volumes, destaging a control module journal and persisting a hash tree and dirty tree metadata, destaging a code cache, dumping hash metadata and physical layout metadata to a separate location in the storage and enabling new metadata updates to a default location. An aspect also includes redirecting new data and metadata IOS to stripes reserved during preparation of the separate location relating to the checkpoint and protecting checkpointed data and metadata, and generating a consistent checkpoint copy of a management module repository in the reserved area of storage.

20 Claims, 17 Drawing Sheets

(56) References Cited

U.S. PATENT DOCUMENTS

| | | |
|---|---|---|
| 8,539,148 B1 | 9/2013 | Chen et al. |
| 8,566,483 B1 | 10/2013 | Chen et al. |
| 8,583,607 B1 | 11/2013 | Chen et al. |
| 8,683,153 B1 | 3/2014 | Long et al. |
| 8,712,976 B1 | 4/2014 | Chen et al. |
| 8,775,388 B1 | 7/2014 | Chen et al. |
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 8,990,495 B2 | 3/2015 | Hallak et al. |
| 9,087,006 B2 | 7/2015 | Yochai et al. |
| 9,104,326 B2 | 8/2015 | Frank et al. |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,606,870 B1 | 3/2017 | Meiri et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,310,951 B1 | 6/2019 | Chen et al. |
| 10,359,968 B1 | 7/2019 | Chen et al. |
| 10,417,190 B1 * | 9/2019 | Donlan ............... G06F 16/10 |
| 2003/0154399 A1 | 8/2003 | Zuk et al. |
| 2004/0193945 A1 * | 9/2004 | Eguchi ............... G06F 11/142 |
| | | 714/6.1 |
| 2006/0026319 A1 * | 2/2006 | Rothman ........... G06F 11/1469 |
| | | 710/100 |
| 2007/0088912 A1 | 4/2007 | Mukherjee et al. |
| 2013/0332660 A1 * | 12/2013 | Talagala ............ G06F 12/0246 |
| | | 711/103 |
| 2017/0139832 A1 | 5/2017 | Gupta et al. |
| 2017/0371572 A1 | 12/2017 | Lee |
| 2018/0114153 A1 | 4/2018 | Massarenti et al. |

OTHER PUBLICATIONS

U.S. Appl. No. 15/499,943, filed Apr. 28, 2017, Kucherov et al.
U.S. Appl. No. 15/499,947, filed Apr. 28, 2017, Kucherov et al.
U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/038,543, filed Jul. 18, 2018, Chen et al.
U.S. Appl. No. 16/042,363, filed Jul. 23, 2018, Chen et al.
U.S. Appl. No. 16/048,767, filed Jul. 30, 2018, Chen et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/167,858, filed Oct. 23, 2018, Chen et al.
U.S. Appl. No. 16/169,202, filed Oct. 24, 2018, Chen et al.
U.S. Appl. No. 16/175,979, filed Oct. 31, 2018, Hu et al.
U.S. Appl. No. 16/177,782, filed Nov. 1, 2018, Hu et al.
U.S. Appl. No. 16/254,897, filed Jan. 23, 2019, Chen et al.
U.S. Appl. No. 16/254,899, filed Jan. 23, 2019, Chen et al.
U.S. Appl. No. 16/263,414, filed Jan. 31, 2019, Meiri et al.
U.S. Appl. No. 16/264,825, filed Feb. 1, 2019, Chen et al.
U.S. Appl. No. 16/264,982, filed Feb. 1, 2019, Chen et al.
Notice of Allowance dated May 7, 2019 for U.S. Appl. No. 15/499,935; 8 Pages.

* cited by examiner

MAINTAINING HARVESTED METADATA AND PHYSICAL LAYOUT METADATA CONSISTENCY BY PERSISTING PHYSICAL LAYOUT OFFSETS OF HARVESTED METADATA AND PHYSICAL LAYOUT METADATA FOR DISCOVERY DURING CHECKPOINT RECOVERY USING THE CHECKPOINT OBJECT
516

SENDING BY A DATA MODULE THE PHYSICAL LAYOUT OFFSETS OF HARVESTED METADATA AND PHYSICAL LAYOUT METADATA TO A SYSTEM MANGEMENT MODULE AND STORING THE PHYSICAL OFFSETS OF HARVESTED METADATA AND PHYSICAL LAYOUT METADATA IN A SYSTEM MANAGEMENT MODULE REPOSITORY MANAGEMENT DATABASE
518

MAINTAINING DISK MANAGEMENT DATABASE COPY CONSISTENCY USING A PERSISTENT FLAG IN SYSTEM MANAGEMENT MODULE METADATA RECORD INDICATING WHETHER A CHECKPOINT COPY OF A SYSTEM MANAGEMENT MODULE REPOSITORY WAS SUCCESSFULLY GENERATED AND STORED SO IT CAN BE USED WHEN A CHECKPOINT RECOVERY OPERATION USING THE CHECKPOINT OBJECT IS INITITATED
520

*Fig. 6B*

ONLINE SYSTEM CHECKPOINT RECOVERY ORCHESTRATION

BACKGROUND

Flash based enterprise storage systems, also referred to herein as content addressable storage system (such as XtremIO), support a rich set of advanced data services such as single data instance, compression, snapshots, thin provisioning and the like. These systems are able to achieve the advanced data services by decoupling storage access, logical volume address space, and physical on-disk location of data. Conventional storage systems may use metadata journals to preserve the consistency of a system. In the case of system failure and reboot, the persisted journal could be used to recover the system. However, if for some reason the journal fails to persist, the system needs to be recovered via more traditional approaches, such as restoring from one or more backups, or manually fixing the on-disk metadata configuration and data. Those approaches require taking the system offline for a prolonged period of time, expertise on disk data/metadata layout and content, or both. Even so, there is no guarantee that the system can be recovered if the configuration has changed or been lost, or if the metadata failed to persist on-disk.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Note that each of the different features, techniques, configurations, etc. discussed in this disclosure can be executed independently or in combination. Accordingly, embodiments of the present invention can be embodied and viewed in many different ways. For additional details, elements, and/or possible perspectives (permutations) of the invention, the reader is directed to the Detailed Description section and corresponding figures of the present disclosure as further discussed below.

In the event of a system failure, an online system checkpoint may provide a way to recover the system. In one embodiment, a consistent online system checkpoint accomplishes recovery by maintaining a consistent point in time image including at least a volume configuration, logical volume space, layers of metadata and physical data storage, as well as other information. In the case of a system failing to come up regularly due to data/metadata inconsistency, the system can be recovered using the consistent online system checkpoint. The creation of a consistent online system checkpoint is transparent to a user application without impacting normal host reads and writes.

One embodiment provides a method for online system checkpoint generation recovery orchestration for a storage system. The method includes generating a checkpoint for a storage system containing an image for a point in time for the storage system. The method also includes storing, in a reserved area of the storage location, volume configuration data corresponding to volumes for the point in time, a plurality of layers of metadata for the point in time, and physical data for the point in time. The method further includes creating consistent snapshots for the volumes, destaging a control module journal and persisting a control module hash tree and dirty tree metadata, destaging a user defined code cache, dumping hash metadata and physical layout metadata to a separate location in the storage system and enabling new metadata updates to a default location, and redirecting the new data and metadata input/outputs (IOs) to stripes reserved during preparation of the separate location relating to the checkpoint and protecting checkpointed data and metadata. The method also includes generating a consistent checkpoint copy of a system management module repository in the reserved area of storage.

Another embodiment provides a system for online system checkpoint generation recovery orchestration for a storage system. The system includes a processor and memory storing computer program code that when executed on the processor causes the processor to operate a storage system. The storage system is operable to perform operations. The operations include generating a checkpoint for a storage system containing an image for a point in time for the storage system. The operations also include storing, in a reserved area of the storage location, volume configuration data corresponding to volumes for the point in time, a plurality of layers of metadata for the point in time, and physical data for the point in time. The operations further include creating consistent snapshots for the volumes, destaging a control module journal and persisting a control module hash tree and dirty tree metadata, destaging a user defined code cache, dumping hash metadata and physical layout metadata to a separate location in the storage system and enabling new metadata updates to a default location, and redirecting the new data and metadata input/outputs (IOs) to stripes reserved during preparation of the separate location relating to the checkpoint and protecting checkpointed data and metadata. The operations also include generating a consistent checkpoint copy of a system management module repository in the reserved area of storage.

Another embodiment provides a computer program product for online system checkpoint generation recovery orchestration for a storage system. The computer program product includes a non-transitory computer readable storage medium having computer program code encoded thereon that when executed on a processor of a computer causes the computer to operate a storage system. The computer program product performs operations. The operations include generating a checkpoint for a storage system containing an image for a point in time for the storage system. The operations also include storing, in a reserved area of the storage location, volume configuration data corresponding to volumes for the point in time, a plurality of layers of metadata for the point in time, and physical data for the point in time. The operations further include creating consistent snapshots for the volumes, destaging a control module journal and persisting a control module hash tree and dirty tree metadata, destaging a user defined code cache, dumping hash metadata and physical layout metadata to a separate location in the storage system and enabling new metadata updates to a default location, and redirecting the new data and metadata input/outputs (IOs) to stripes reserved during preparation of the separate location relating to the checkpoint and protecting checkpointed data and metadata. The operations also include generating a consistent checkpoint copy of a system management module repository in the reserved area of storage.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIGS. 6A-6b depict a flowchart of an illustrative process of maintaining consistency for an online system checkpoint in accordance with illustrative embodiments;

DETAILED DESCRIPTION

Figure 1A:
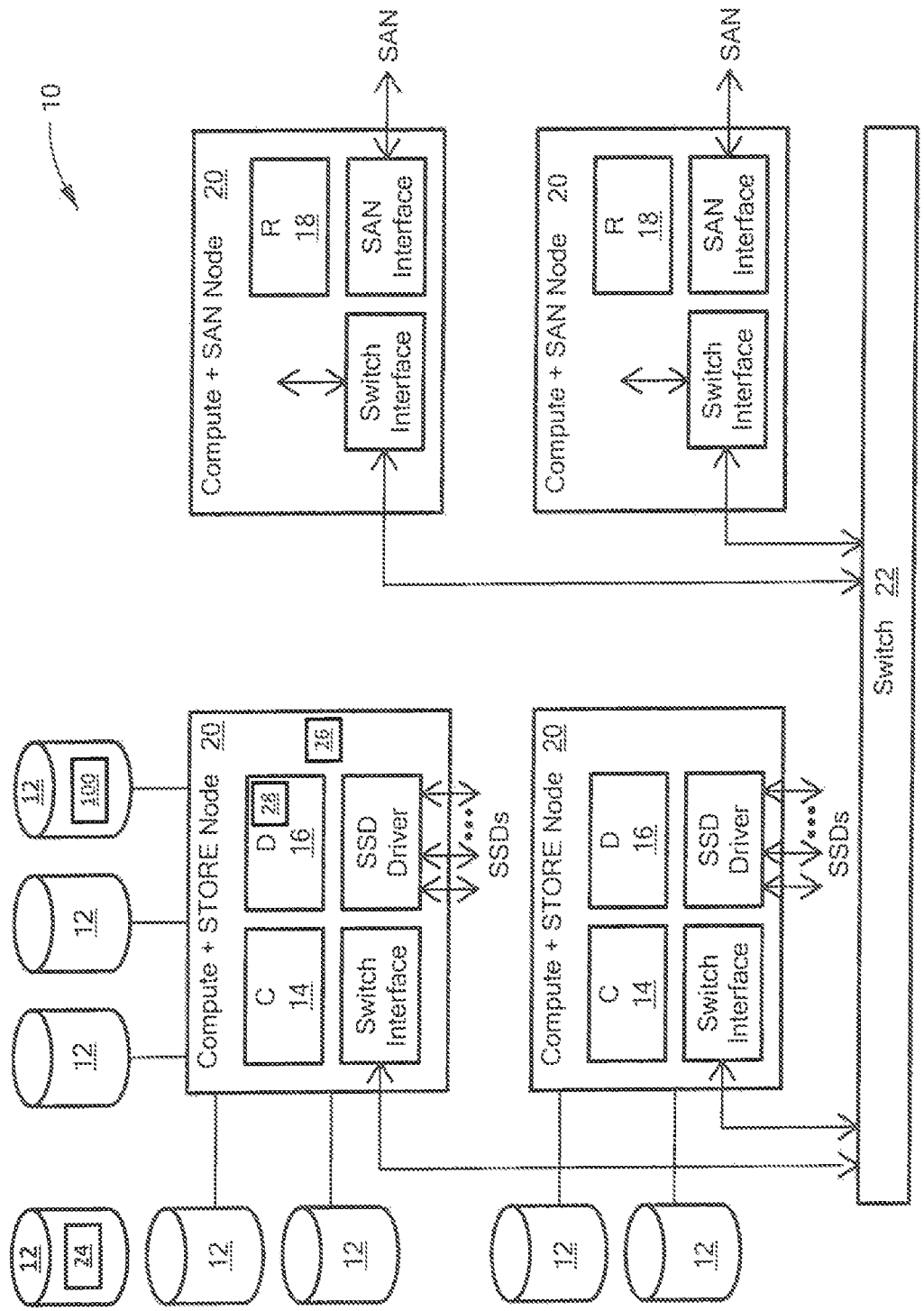
FIGS. 1A and 1B are block diagrams of a data storage system in accordance with one illustrative embodiment.

Before describing embodiments of the concepts, structures, and techniques sought to be protected herein, some terms are explained. In some embodiments, the term "I/O request", "I/O" or "IO" may be used to refer to an input or output request (e.g., a data read or data write request). The term "storage system" may encompass physical computing systems, cloud or virtual computing systems, or a combination thereof. The term "storage device" may refer to any non-volatile memory (NVM) device, including hard disk drives (HDDs), solid state drives (SSDs), flash devices (e.g., NAND flash devices), and similar devices that may be accessed locally and/or remotely (e.g., via a storage attached network (SAN)). The term "storage device" may also refer to a storage array including multiple storage devices. The term "system control module" may refer to a system-wide management module that provides a complete view of the hardware and software components, is responsible for system availability and initiates any changes in system configuration to achieve maximum availability and redundancy.

A content addressable storage system supports a rich set of advanced data services such as single data instance, compression, snapshots, thin provisioning and the like. These systems are able to achieve advanced data services by decoupling storage access, logical volume address space, and physical on-disk location of data. Volume and physical layout metadata offers flexibility in decoupling and virtualization. However, because of this, there may be relatively little straightforward mapping between how data is presented to a host, and how the data and metadata are stored. When a system fails due to hardware or software issues, the flexibility may translate into complexity in recovery, and consistency may need to be restored between data and various layers of metadata.

Embodiments of the presently disclosed method and apparatus for providing a consistent online system checkpoint addresses the recovery complexity of restoring a storage system to a known good state by generating an online system wide checkpoint that maintains consistency among volume configuration, logical volume space, metadata and physical data storage. In the case of a system failing to come up regularly due to data/metadata inconsistency, the system can be recovered using the checkpoint. The creation of system wide checkpoint is transparent to the user application and does not impact to normal host reads and writes.

Embodiments of the presently described methods and apparatus for providing an online consistent system checkpoint permit a user to proactively create a consistent system checkpoint without interruption to host IO. In the event the system fails to boot up, a user could instruct the system to start from a previous consistent online system checkpoint with a command. The system will in turn load the checkpointed configuration, metadata and data, and recover the system to a known good state, which is the state when the checkpoint was generated.

Referring to the embodiment of FIG. 1a, a data storage system 10 includes a plurality of nodes 20 connected over a network by a switch 22. The system 10 includes data storage devices 12 on which data blocks are stored. One or more of data storage devices 12 may be production volumes, which are used by the storage system during processing of IO requests. One or more of data storage devices 12 may include journals 24. Journals 24 may include control module journals and/or data module journals A particular storage device may also include a checkpoint 100. Each node 20 includes one or more computing modules, such as control modules 14, data modules 16, and routing modules. In many embodiments, a given node may include at least one of a routing, control, or data module. In certain embodiments, a node may include a multiplicity of any or all of these modules.

Referring again to FIG. 1, the storage devices 12 are networked to computing modules, including control modules 14 and data modules 16. The control modules 14 control execution of read and write commands. The control modules 14 contain the address to hash mapping table which is the first layer of indirection. Data services such as snapshots, de-duplication, thin provisioning, are handled in the control modules 14 in example embodiments.

The data modules 16 are connected to the storage devices 12 and, under control of a respective control module 14, pass data to or from the storage devices 12. The data modules 16 contain the hash to physical (H2P) Solid State Drive (SSD) address mapping. The data modules 16 are also responsible for IO operations to the SSDs themselves, as well as managing the data protection scheme. In a particular embodiment the data module may include a plurality of counters 28.

Routing modules 18 route processing throughout the system 10. In some embodiments, routing modules may terminate storage and retrieval operations and distribute command parts of any operations to control modules that are explicitly selected for the operation in such a way as to retain balanced usage within the system. In a particular embodiment, the routing module 18 is responsible for two Fiber Channel and two Internet Small Computer System Interconnect (ISCSI) ports on the node and functions as the ingress/egress point for IO of the node. The routing module 18 is also responsible for breaking I/O into chunks and calculating the data hash values using a secure hash algorithm.

In certain embodiments, the computing modules (e.g., data, control, and/or routing modules) may include executable computer code configure to perform processing described below in conjunction with FIGS. 3-4. In many embodiments, each node runs multiple processes in parallel.

In some embodiments, the computing modules carry out content addressing for storage and retrieval. In certain embodiments, control and data modules may retain extracts of the data stored in the storage device, and the extracts may be used for the content addressing. In many embodiments, the extracts may be computed by cryptographic hashing of the data, e.g., the modules may calculate hash values for data that are the subject of I/O commands, and the hash values may later be used for retrieval. In particular embodiments, hashing used for the content addressing produces evenly distributed results over the allowed input range. The hashing defines the physical addresses so that data storage makes even use of the system resources.

In certain embodiments, data is stored in blocks, where each block has a unique large hash signature. In some embodiments, relatively small granularity may be used for blocks, for example with a block size of 4 KB, although smaller or larger block sizes may be selected. In many embodiments, a user I/O request larger than 4 KB or other system-determined block size may be converted into a plurality of I/O operations within the system, each one separately hashed and separately processed.

In particular embodiments, data blocks are stored to solid-state disks (SSDs). In some embodiments, a data storage system is a flash-based key/value cluster storage array. In some embodiments, the storage devices may include solid-state random access storage devices. In other embodiments, the storage devices may include spinning disk devices.

In some embodiments, content addressable storage (CAS) can be used to ensure that data appearing twice is stored at the same location (e.g., to identity and avoid duplicate write operations). In many embodiments, CAS can be used to provide de-duplication within a data storage system, ensuring that the same data is not stored twice in different places.

In some embodiments, the separation of control and data may enable a substantially unlimited level of scalability, since control operations can be split over any number of processing elements, and data operations can be split over any number of data storage elements. In many embodiments, the separation of control and data may provide one or more of the following: (a) parallel operation of certain control and data actions over multiple nodes/modules; (b) use of optimal internal communication/networking technologies per the type of operation (control or data), designed to minimize the latency (delay) and maximize the throughput of each type of operation.

In many embodiments, routing modules may use hash values, calculated from data associated with the operations, to select the control module for the distribution. In certain embodiments, a control module may be selected based on a user-specified address. In many embodiments, the hash value may be used for selecting the data module, and for setting the physical location for data storage within the data module. In some embodiments, the routing modules and/or data modules may provide deduplication by comparing the extracts or hash values of write data with hash values of already stored data, and where a match is found, simply point to the matched data and avoid rewriting.

In various embodiments, routing modules decouple data storage patterns from I/O patterns. In some embodiments, a routing module may break up incoming blocks that are larger than a given granularity size and send the relevant parts to the appropriate control modules. In many embodiments, a control module may handle a range or set of addresses within a logical unit (LU). In particular embodiments, a control module may break up a block it receives for distribution to data modules, at a pre-determined granularity. In one embodiment, a request to write a sixty-four (64) KB block may end up being broken up into sixteen (16) internal writes, each write comprising a four (4) KB block.

In some embodiments a system control module 26 determines which modules are to execute on what storage controller, initiates failovers of data ownership from one storage controller to another, and initiates rebuilds upon SSD failures. Only one system control module is the active management entity, and the sole entity that makes system-wide decisions, at any single point in time. Should the component running the active system control module fail, another system control module becomes active, and takes over. Additional software logic running on each storage controller verifies that one, and only one, system control module is active in the system, to eliminate the possibility of not having a running system control module or having more than one operating system control module.

Figure 1B:
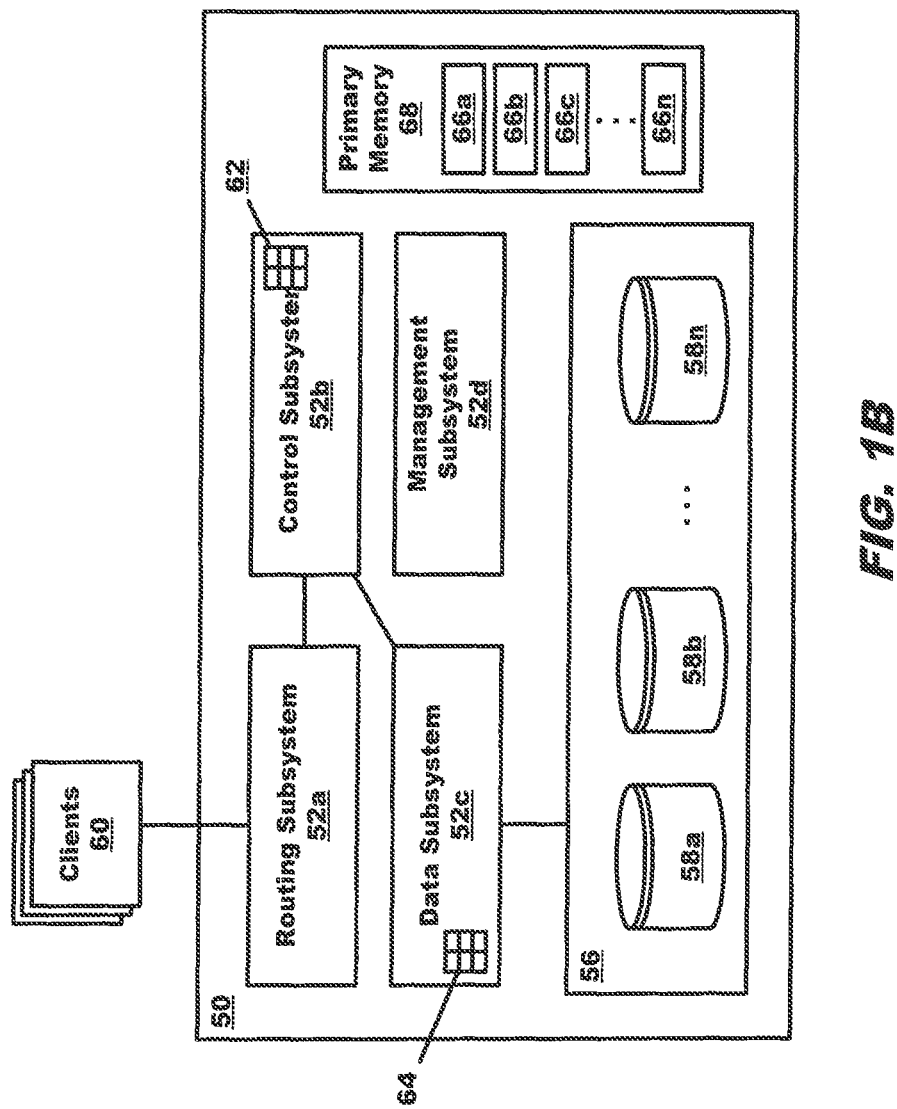

Referring now to FIG. 1B another block diagram of an example storage system 50 according to an illustrative embodiment of the disclosure. The storage system 50 may include a plurality of subsystems 52a-52d (generally denoted 52 herein), a storage array 56 comprising a plurality of storage devices 58a ... 58n (generally denoted 58 herein), and a primary memory 68. In some embodiments, the storage devices 58 may be provided as random access storage devices, such as solid-state devices (SSDs).

The primary memory 68 can be any type of memory having access times that are significantly faster compared to the storage devices 58. In some embodiments, primary memory 68 may be provided as dynamic random-access memory (DRAM). In certain embodiments, primary memory 68 may be provided as synchronous DRAM (SDRAM). In one embodiment, primary memory 68 may be provided as double data rate SDRAM (DDR SDRAM), such as DDR3 SDRAM. The primary memory elements are shown as 66a-66n.

In the embodiment shown, the subsystems 52 include a routing subsystem 52a, a control subsystem 52b, a data subsystem 52c, and a management subsystem 52d. In one embodiment, subsystems 52 may be provided as software components, i.e., computer program code that, when executed on a processor, may cause a computer to perform functionality described herein. In a certain embodiment, the storage system 50 includes an operating system (OS) and one or more of the subsystems 52 may be provided as user space processes executable by the OS. In other embodiments, the subsystems 52 may be provided, at least in part, as hardware, such as digital signal processor (DSP) or an application specific integrated circuit (ASIC) configured to perform functionality described herein.

The routing subsystem 52a may be configured to receive I/O operations from clients 60 using, for example, an external application-programming interface (API) and to translate client I/O operations into internal commands. In some embodiments, the routing subsystem 52a is configured to receive commands from small computer system interface (SCSI) clients 60. The control subsystem 52b may be configured to maintain a mapping between I/O addresses associated with data and the corresponding chunk hashes.

The data subsystem 52c may be configured to maintain a mapping between chunk hashes and physical storage addresses 64 (i.e., storage locations within the storage array 56 and/or within individual storage devices 58). The data subsystem 52c may be also be configured to read and write data from/to the storage array 56 (and/or to individual storage devices 108 therein, as shown in FIG. 2).

The management subsystem 52d may be configured to monitor and track the status of various hardware and software resources within the storage system 50. In some embodiments, the management subsystem 52d may manage the allocation of memory by other subsystems (e.g., subsystems 52a-52c). In some embodiments, the management subsystem 52d can also be configured to monitor other subsystems 52 (e.g., subsystems 52a-52c) and to use this information to determine when the storage system 50 may begin processing client I/O operations after a restart using a checkpoint 100 (e.g., the checkpoint shown in FIG. 1A).

A subsystem 52 may store various types of information within primary memory 68. In some embodiments, subsystems 52 cache metadata within primary memory 68 to improve system performance. In some embodiments, a subsystem 52 (e.g., control subsystem 52c) may maintain a change journal 62 to efficiently handle changes to metadata or other information. Such change journals may also be stored in primary memory 68.

Figure 2:
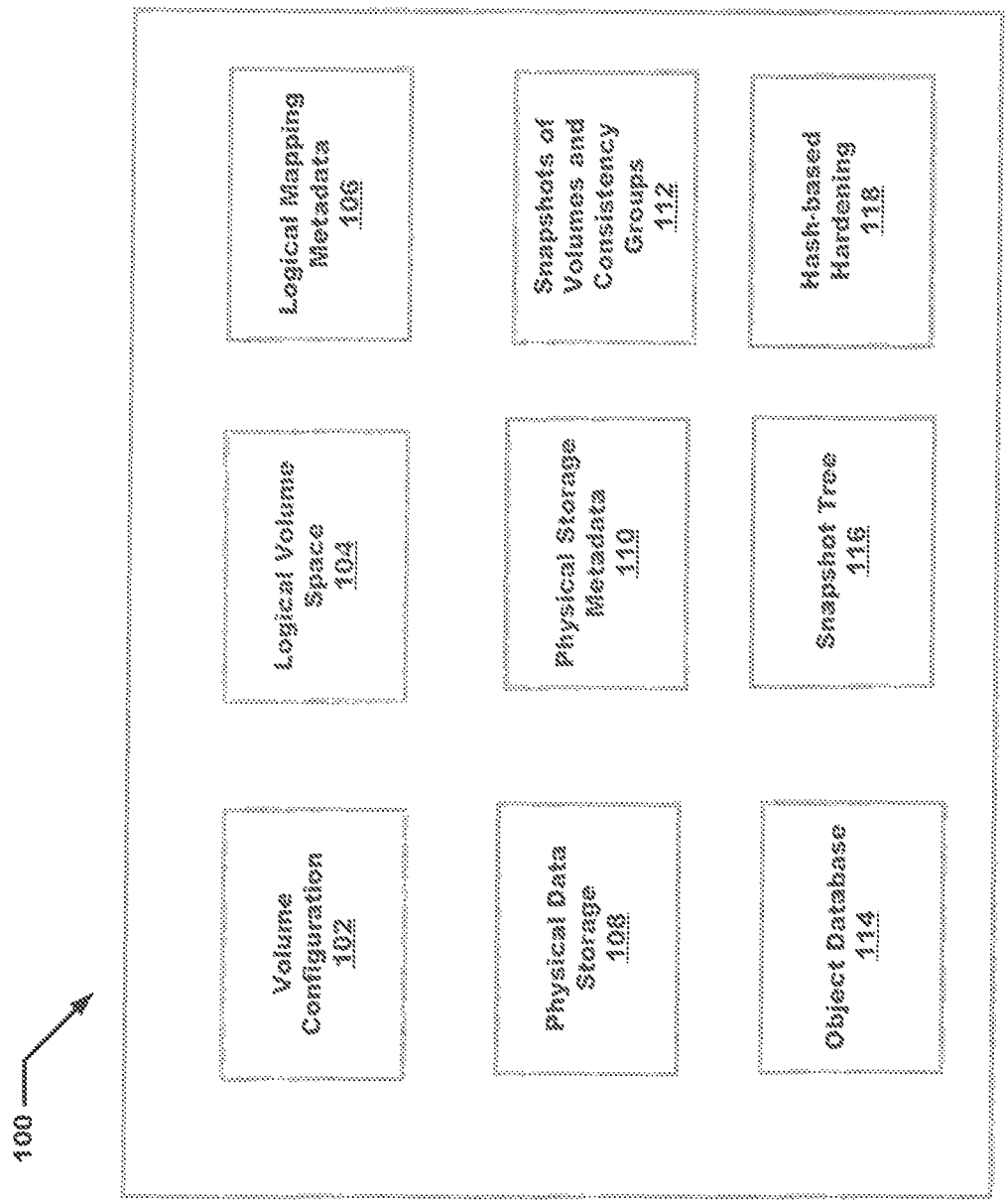
FIG. 2 is a block diagram of a consistent online system checkpoint in accordance with one illustrative embodiment.

Referring now to FIG. 2, a block diagram of a particular embodiment of a checkpoint 100 is shown. As shown in FIG. 1 the checkpoint 100 is stored on a particular storage device. In this particular embodiment the checkpoint 100 includes volume configuration 102, a logical space volume 104, logical mapping metadata 106, physical data storage 108, physical storage metadata 110, snapshots of volumes and consistency groups 112, an object database 114, a snapshot tree 116 and a hash-based hardening object 118.

In embodiments information in checkpoint 100 may provide enough information to recover a system that has failed to come up properly and needs to be restored to a known good previous state of data, metadata and configuration information. As shown in FIG. 2, a particular embodiment of a consistent online system checkpoint includes a volume configuration 102 which specifies the volumes and their components in detail, including options and relevant information about the volumes.

FIG. 2 also shows a logical volume space 104 which defines each volume group, and/or one or more logical volumes within a volume group. Data on logical volumes appears to be contiguous to the user but can be discontiguous on the physical volume. This allows file systems, paging space, and other logical volumes to be re-sized or relocated, to span multiple physical volumes, and to have their contents replicated for greater flexibility and availability in the storage of data. In embodiments, the storage system includes first and second levels of indirection. The first level includes mapping of the logical space to hashes and another level includes mapping of the hashes to physical space. The logical mapping metadata 106 may comprise metadata for mapping of logical volume space to the hashes which is handled by the control module.

The example embodiment of the checkpoint shown in FIG. 2 also includes physical data storage 108 which is accessed by the second level of indirection using the physical storage metadata 110. The physical storage metadata 110 comprises metadata for mapping the hashes to physical storage 108. This mapping is handled by the data module in some embodiments. Also shown in FIG. 2 are the snapshots of volumes and consistency groups 112 comprising a modifying write replica of each volume. A consistency group can include multiple volumes. In some embodiments the snapshots comprise a random access memory-only consistent copy of a volume at a particular point in time. The random access memory snapshots may be hardened (written to disk and protected).

The example checkpoint of FIG. 2 further includes an object database 114 which is used by the system control process to determine which modules are to execute on what storage controller, initiate failovers of data ownership from one storage controller to another, and initiate rebuilds upon SSD failures. Also shown is the snapshot tree 116. Snapshot tree 116 comprises a unique metadata tree structure that directs I/O to the right version of the data. Hash-based hardening 118 is used to provide a secured permanent set of data from which a recovery may be performed.

By way of embodiments of the above-described checkpoint, a system can be restored to a known good state in an efficient and safe manner. The checkpoint is generated in such a way as to not impact normal host reads and writes as well as being transparent to a user.

Figure 3A:
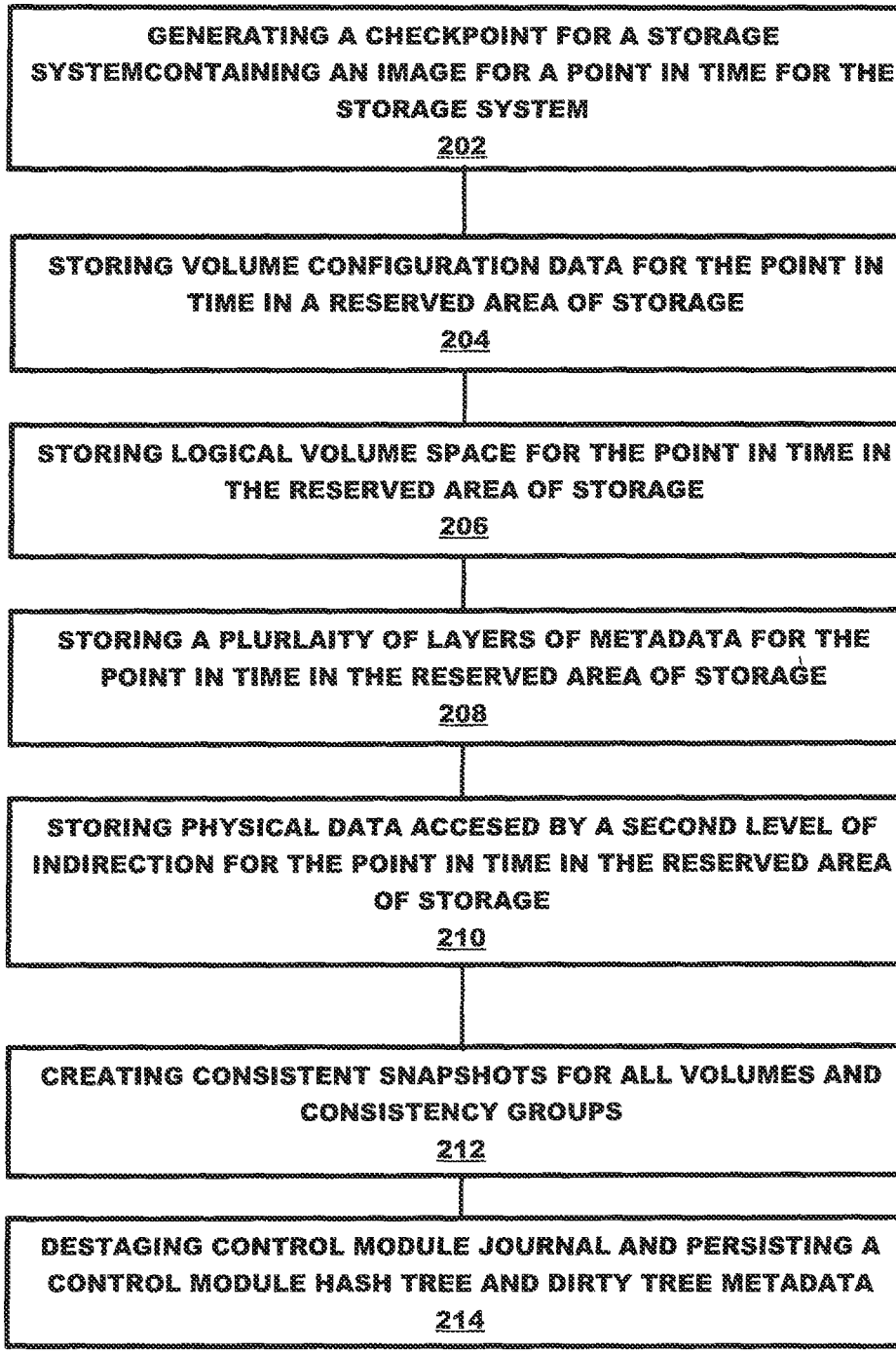
FIGS. 3A and 3B are flowchart of an illustrative process of generating a consistent online system checkpoint in accordance with illustrative embodiments.
Figure 3B:
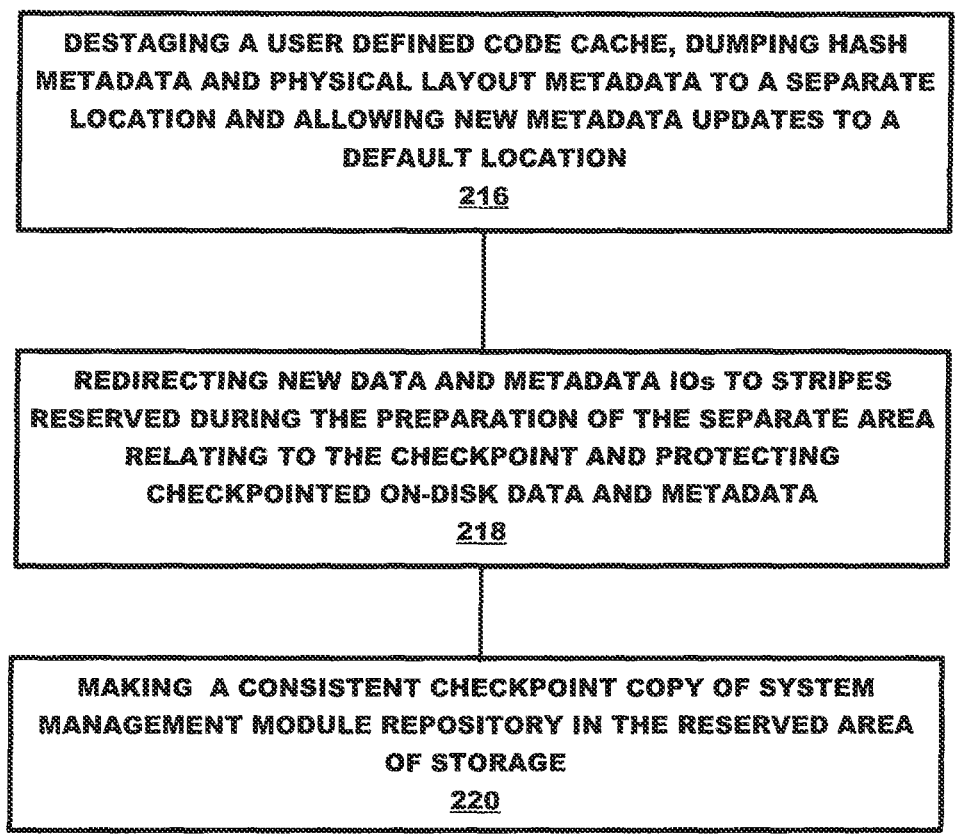
Figure 4:
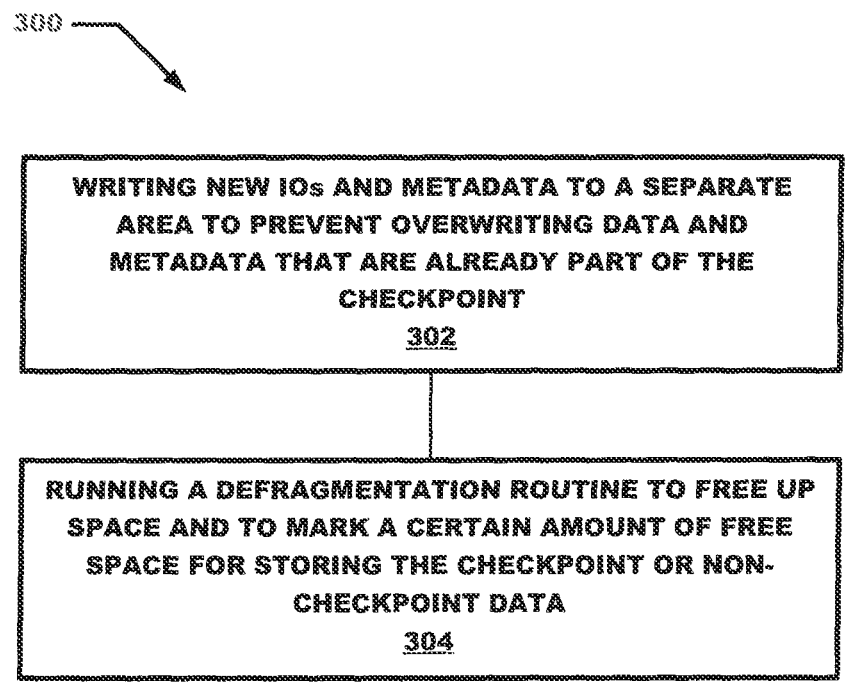
FIG. 4 is a flowchart of an illustrative process of preparing a storage area for generation of an online consistent system checkpoint in accordance with illustrative embodiments.

Referring now to FIGS. 3A, 3B and 4, flow charts of embodiments of the presently disclosed methods are depicted. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order. The rectangular elements are herein denoted "processing blocks" and represent computer software instructions or groups of instructions.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown.

FIGS. 3A and 3B are flow diagrams of an illustrative process 200 for generating an online consistent system checkpoint. Process 200 starts with processing block 202 which discloses generating a checkpoint for a storage system containing an image for a point in time for the storage system.

Processing block 204 shows storing volume configuration data for the point in time in a reserved area of storage on a designated storage device. Processing block 206 shows storing logical volume space for the point in time in the reserved area of storage. The reserved area of storage may be the area where the checkpoint will be stored.

Processing block 208 recites storing a plurality of layers of metadata for the point in time in the reserved area of storage. In some embodiments the plurality of levels of metadata include the metadata for mapping of the logical space to hashes, also referred to as a first level of indirection, and the mapping of the hashes to physical space, also referred to as a second level of indirection. Processing block 210 discloses storing physical data accessed by the second level of indirection in the reserved area of storage.

Processing block 212 shows generating consistent snapshots for volumes and consistency groups. A consistency group can include multiple volumes. The snapshots may comprise a Random Access Memory (RAM)-only consistent copy of a volume at a particular point in time.

Processing block 214 recites destaging the control module journal and persist control module hash tree and dirty tree metadata. The dirty tree metadata comprises an original metadata tree which has subsequently been modified. This involves writing the journal for the control module and making a permanent copy of the control module hash tree and the updated metadata tree.

Processing block 216 (FIG. 3B) discloses destaging the user defined code cache, dumping hash metadata and physical layout metadata to a separate location and allowing new metadata updates to a default location. This is done so the current version of the data captured by the checkpoint does not get overwritten by updates occurring after the checkpoint was created.

Processing block 218 shows redirecting new data and metadata IOs to stripes reserved during the preparation of a separate area relating to a checkpoint and protecting checkpointed on-disk data and metadata. An example preparation process is described below in the explanation of FIG. 4.

Processing block 220 recites making a consistent checkpoint copy of system control repository to a separate location. The system control repository may comprise an object database used for managing the checkpoint processing.

Having performed the example process of FIGS. 3A and 3B, an online consistent system checkpoint may be generated which will permit recovery to a known good state in the event of a system failure.

Referring now to FIG. 4, a particular embodiment of a process 300 for preparing a separate storage area for an online consistent system checkpoint is shown. In embodiments this process 300 is performed before the checkpoint generation process described in FIGS. 3A and 3B. In this embodiment process 300 begins with processing block 302 which discloses writing new IOs and metadata to the separate storage area to prevent overwriting data and metadata that are already part of the checkpoint. This prevents inconsistency between the different layers of metadata and the data captured by the checkpoint.

Processing block 304 shows running a defragmentation routine to free up storage space and to mark a certain amount of free space. The checkpoint stripes may be used as available stripes for use by non-checkpoint data.

The online consistent system checkpoint can be used in a recovery operation. System control is started using the checkpoint repository and constructing in memory a database based on the checkpointed configuration. A volume identifier of production volumes is assigned to checkpoint snapshots and the potentially corrupted production volumes are deleted.

A data module is loaded from the checkpoint copy of persisted metadata and physical layout metadata and is used to recover user data and logical volume metadata. The control module is loaded based on recovered volume metadata and user data.

When a system fails due to hardware or software issues, the flexibility provided by decoupling the storage access, logical volume address space, and physical on-disk location of data translates into complexity in recovery, and consistency needs to be restored between data and various layers of metadata. Embodiments of the presently described online system checkpoint recovery orchestration describes embodiments of a process for recovering different components in the system using the checkpoint on-disk content, and achieves automated reliable system recovery based on the checkpoint.

An online system checkpoint provides a way to recover content addressable storage systems, by maintaining a consistent point in time image among volume configuration, logical volume space, metadata and physical data storage. In the case of system failing to come up regularly due to data/metadata inconsistency, the storage system may be recovered using the persistent checkpoint image. The recovery from checkpoint is an elaborate and complex process, and certain recovery flow and synchronization should be followed. Without clear orchestration and precise timing of individual steps, the recovery may fail to bring up the system in a consistent manner.

By way of the above-described checkpoint, a system may be restored to a known good state in an efficient and safe manner. An example embodiment of an automated recovery orchestration described below provides a way to reliably and automatically recover the system to the state when the checkpoint was created. There are multiple scenarios from which a system may start recovery using a checkpoint. In one scenario, the cluster could encounter sudden power loss and battery failure. When the controller nodes come back up, a platform module will try to recover a system management process as in a normal reboot case. However, system management may not be able to start successfully due to loss of journal, or failure to bring up recovery, control and data modules due to metadata/data loss. In another scenario a user is able to stop the cluster, and try to restart from a checkpoint. This is more common in planned maintenance, or test checkpoint cases. Other scenarios may also exist that require recovery using a checkpoint.

In an exemplary embodiment, an online system checkpoint recovery orchestration process starts by the platform module receiving a user request to recover a system management process from the checkpoint. If there is a system management process running, the running system management process is terminated. The cluster component in the platform module updates the system management initialization parameter file by setting a "start from checkpoint" option, and a new system management process is started with the updated initialization parameter.

When a system management module starts from the checkpoint, the system management module loads a checkpoint copy of the system management repository instead of from the default location. The system management metadata is loaded first, where there is a flag to indicate if system management module management object database was stored successfully or not. The checkpoint system management object database is loaded, and the object database is reconstructed in memory based on the checkpoint. Journal chunks are reformatted and journal entries created after checkpoint generation are discarded. The RAID 1.3 section is mounted, and in-memory system management repository is stored in the default RAID 1.3 location.

Referring back to FIG. 1, the volumes are recovered from the checkpoint snapshots before data path module activation. After recovery of the snapshots from the checkpoint, the data modules 16 are activated with physical location of checkpointed metadata and data module journals 24 are reformatted. Following data module activation, the control modules 14 are activated with recovered volume configuration and the control module journals 24 stored on one of storage devices are reformatted.

The defragmentation mode is set to rollback mode and data on checkpoint stripes that were written after checkpoint creation are deleted. Once defragmentation rollback has completed the host IO direction is set to the checkpoint stripes. Routing modules are activated and host IO operations are allowed. Upon successful system activation, checkpoint recovery is marked as complete and the flag in the platform module is reset.

Figure 5A:
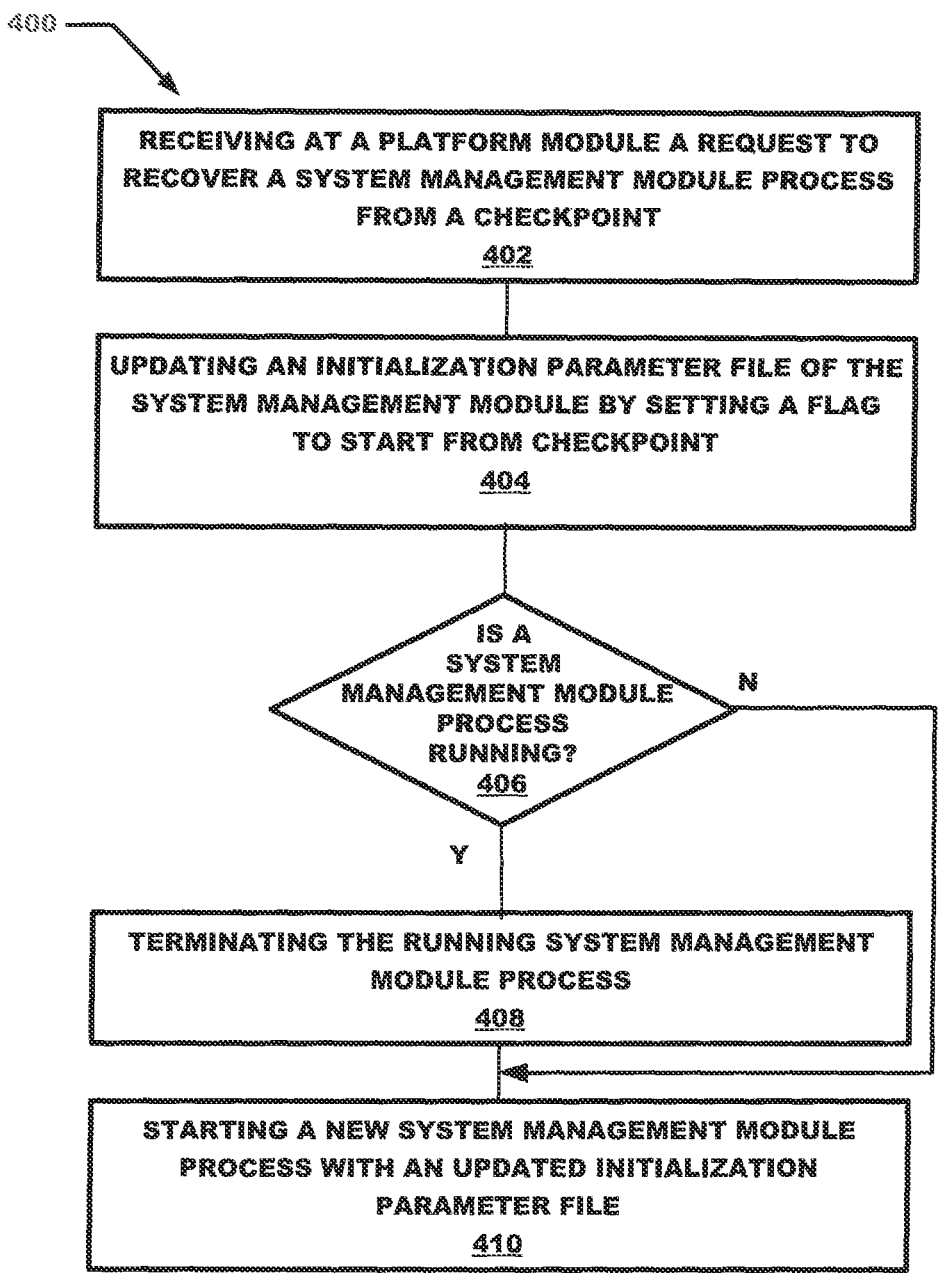
FIGS. 5A-5C depict a flowchart of an illustrative process of providing an online system checkpoint recovery orchestration in accordance with illustrative embodiments.
Figure 5B:
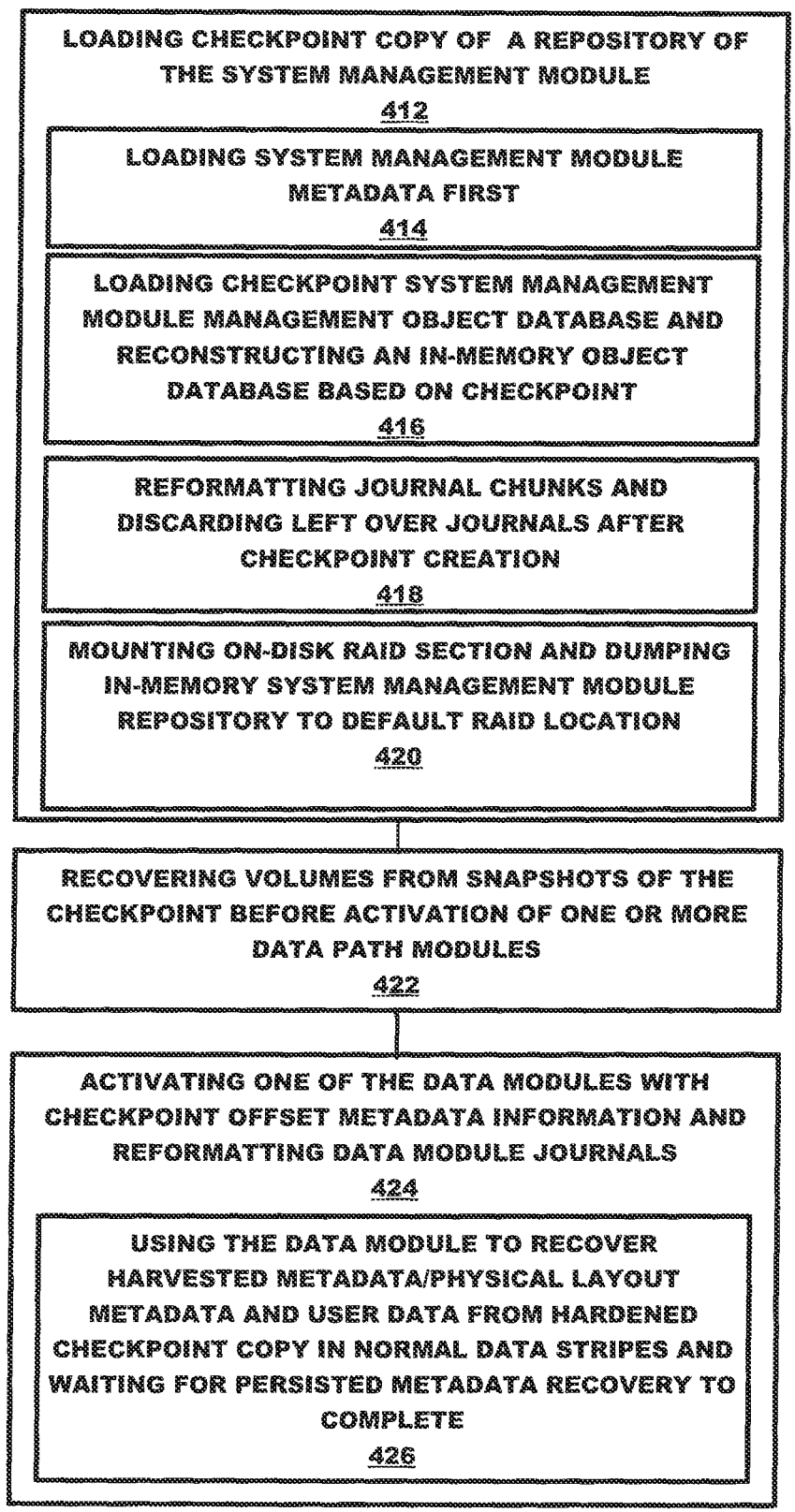
Figure 5C:
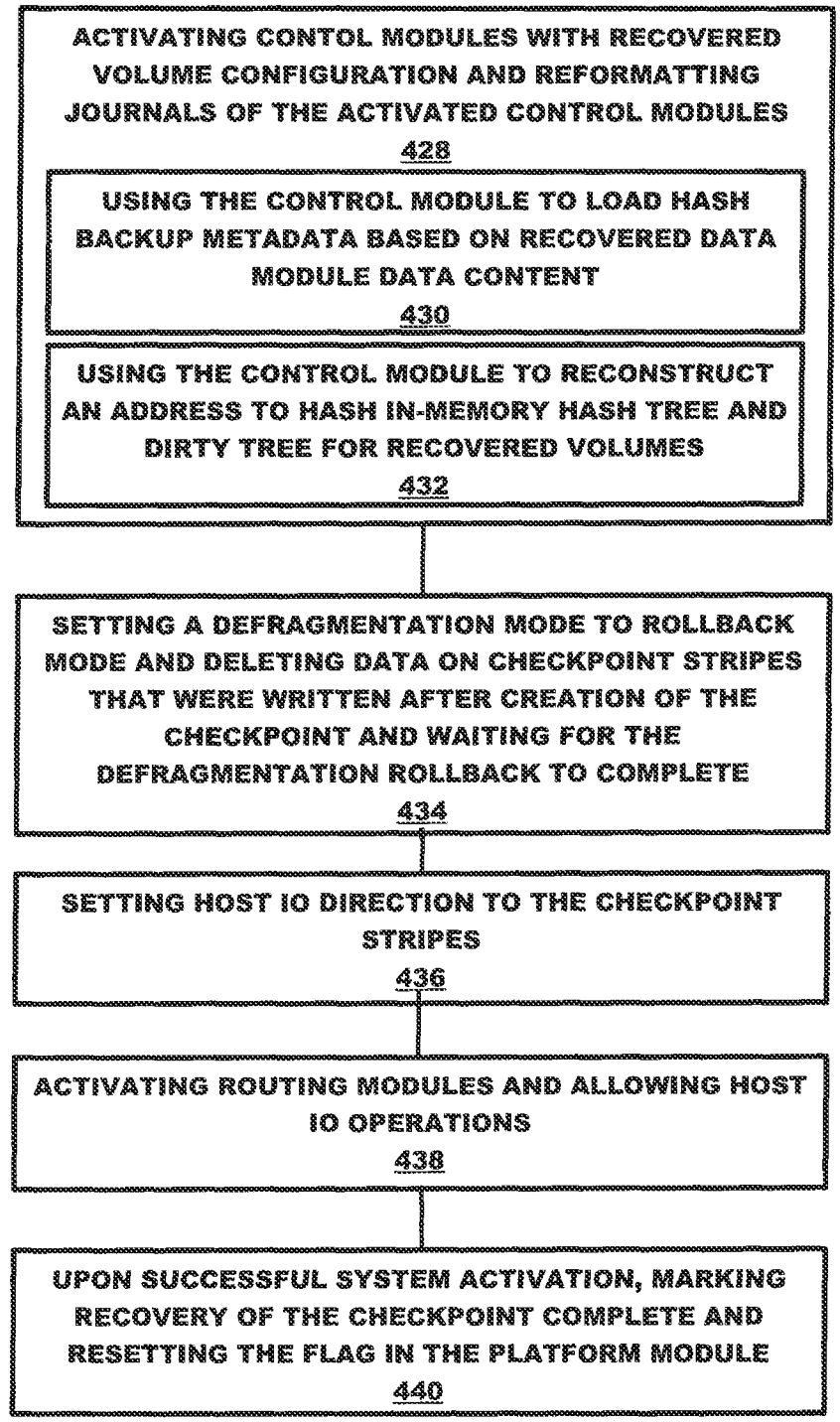

Referring now to FIGS. 5A-5C, a flow chart of an exemplary embodiment of the presently disclosed methods are depicted. It will be appreciated by those of ordinary skill in the art that unless otherwise indicated herein, the sequence of steps described is illustrative only and can be varied without departing from the spirit of the invention. Thus, unless otherwise stated the steps described below are unordered meaning that, when possible, the steps can be performed in any convenient or desirable order. The rectangular elements are herein denoted "processing blocks" and represent computer software instructions or groups of instructions. The diamond shaped elements are herein denoted "decision blocks" and represent computer software instructions, or groups of instructions which affect the execution of the computer software instructions represented by the processing blocks.

Alternatively, the processing blocks and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown.

Referring now to FIGS. 5A-5C, an example embodiment of a process 400 for providing online system checkpoint recovery orchestration is shown. Process 400 begins with processing block 402 which discloses receiving at a platform module, a request to recover a system management module process from a checkpoint. A platform module is responsible for monitoring the hardware of the system. At least one node may run a platform module. This may occur after a sudden power loss and/or battery failure or as part of a planned maintenance event.

Processing block 404 shows updating an initialization parameter file of the system management module by setting a flag to start from the checkpoint. This ensures that the checkpoint is used so that a recovery to a known good state can be accomplished.

Decision block 406 determines whether a system management process is currently running. When the determination is that a system management process is currently running then processing continues with processing block 408. When the determination is that a system management process is not currently running, then processing continues with processing block 410.

Processing block 408 recites terminating the currently running system management process. This is done to prevent a situation wherein multiple system management processes may be running at the same time.

Processing block 410 recites starting a new system management process with the updated initialization parameter file. This ensures the system management process uses the checkpoint to begin the recovery process.

Processing continues as shown in FIG. 5B with processing block 412 which discloses loading a checkpoint copy of a repository of the system management module. Processing block 414 shows loading system management metadata first. Processing block 416 recites loading checkpoint system management object database and reconstructing an in-memory object database based on the checkpoint. Processing block 418 discloses reformatting journal chunks and discarding left over journals after checkpoint generation. Processing block 420 states mounting on-disk RAID section and dumping in-memory system management repository to default RAID location.

Processing block 422 recites recovering volumes from snapshots of the checkpoints before activation of one or more data path modules. This places the volumes in a known good state.

Processing block 424 discloses activating one of the data modules with checkpoint metadata offset information and reformatting data module journals. Processing block 426 shows using the data module to recover persisted metadata/physical location metadata and user data from hardened checkpoint copy in normal data stripes and waiting for harvested metadata recovery to complete.

Processing continues as shown in FIG. 5C with processing block 428 which recites activating control modules with recovered volume objects configuration and reformatting control module journals. Processing block 430 discloses using the control module to load hash backup metadata based on recovered data module data content. Processing block 432 states using the control module to reconstruct an address to hash mapping table in-memory hash tree and dirty tree for recovered volumes.

Processing block 434 recites setting a defragmentation mode to rollback mode and deleting data on checkpoint stripes that were written after creation of the checkpoint and waiting for defragmentation rollback to complete. This allows recovery using only the data captured by the checkpoint.

Processing block 436 discloses setting host IO direction to the checkpoint stripes. Processing block 438 shows activating routing modules and allowing host IO operations. Processing block 440 recites upon successful system activation, marking recovery of the checkpoint complete and resetting the flag in the platform module.

In such a manner, the proper steps have been performed in the correct order and at the proper times to make a recovery of the storage system to a known good state.

In certain embodiments, it may be desirable to ensure consistency of the management database in several aspects across different stages of checkpoint life cycle. To support checkpoint consistency, a checkpoint object is utilized. A checkpoint object is generated when the first checkpoint preparation operation starts. A checkpoint unique identifier and state machine attributes are persisted in the checkpoint objects. The checkpoint state machine is designed in such way that each state handling is idempotent, and the state machine can resume and replay any state. Persistent state attribute updates only occur at the end of a state machine handling routine.

Logical volume configuration consistency may be achieved by utilizing volume snapshots to persist consistent point in time volume images online. The system manager goes through valid consistency groups and volumes to generate online snapshot sets for each one of them. Each checkpoint snapshot set is marked with a unique checkpoint owner identifier. A checkpoint volume snapshot cannot be modified or deleted except through checkpoint recovery and checkpoint delete operations.

In addition, each snapshot set persists the object identifier attribute, which is the source consistency group or production volume external identifier, and is used to re-assign volume identity during recovery.

Normally harvested metadata and physical layout metadata are saved in RAID 1.3 through direct IO, for example. In an online system checkpoint creation case, however, the copy of harvested metadata and physical layout metadata may be saved in RAID 6, for example, so that normal IO metadata can still write to default location RAID 1.3 without interruption. Because of that, there is a need to persist the physical layout offsets of harvested metadata and physical layout metadata in RAID 6 so that they can be found during checkpoint recovery. Each data module produces a list of offsets at the end of data module hardening. Since the offsets are only fully available at the end of data module hardening, there is a need to store the list of offsets outside of the data module metadata, thus the data module sends the information to the system management module which stores this information in the system management repository database.

After control module metadata hardening and data module metadata hardening, a consistent copy of the configuration database also needs to be preserved. Since it may be desirable to continue to support all normal management functions after checkpoint creation, there may be a requirement to store the checkpoint database copy to a separate location. A persistent flag is stored in the system management metadata record to indicate whether a checkpoint copy of system management repository is successful or not. The flag is later used in recovery to check whether the system management repository checkpoint copy is consistent or not.

Figure 6A:
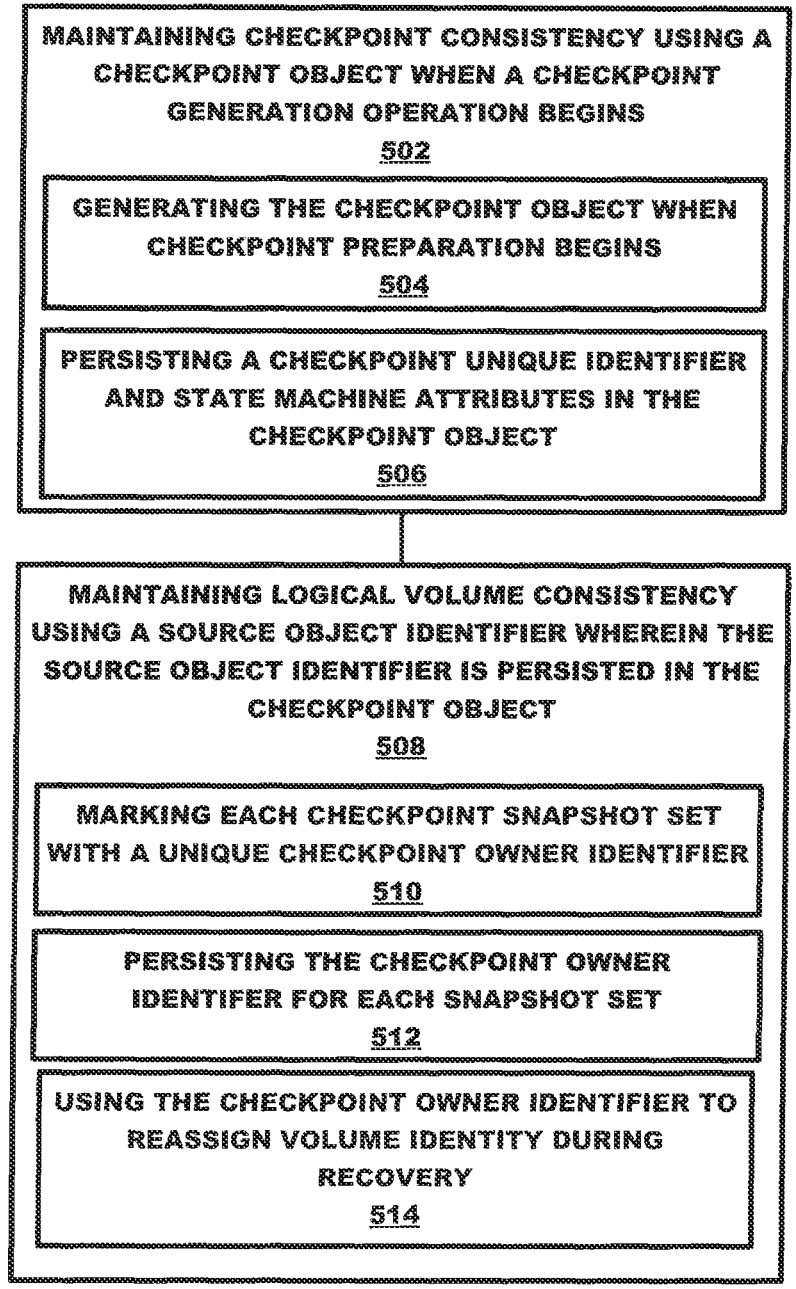

Referring now to FIGS. 6A-6B, an example process 500 for maintaining checkpoint consistency is shown. Process 500 begins with processing block 502 which discloses maintaining checkpoint consistency using a checkpoint object when a checkpoint generation operation begins. As shown in processing block 504, this may include generating the checkpoint object when checkpoint preparation begins. As further shown in processing block 506, this may also include persisting a checkpoint unique identifier and state machine attributes in the checkpoint object.

Processing block 508 shows maintaining logical volume consistency using a source object identifier wherein the source object identifier is persisted in the checkpoint object. As shown in processing block 510 this may include marking each checkpoint snapshot set with a unique checkpoint owner identifier. Processing block 512 recites persisting the checkpoint owner identifier for each snapshot set. Processing block 514 discloses using the checkpoint owner identifier to reassign the volume identity during recovery.

Processing continues in FIG. 6B with processing block 516 which shows maintaining harvested metadata and physical layout metadata consistency by persisting physical layout offsets of harvested metadata and physical layout metadata for discovery during checkpoint recovery using the checkpoint object. As shown in processing block 518, this may further include a data module sending the physical layout offsets of harvested metadata and physical layout metadata to a system management module and storing the physical offsets of harvested metadata and physical layout metadata in a system management module repository management database.

Processing block 520 recites maintaining disk management database copy consistency using a persistent flag in system management module metadata record indicating whether a checkpoint copy of a system management module repository was successfully generated and stored so it can be used when a checkpoint recovery operation using the checkpoint object is initiated.

In another embodiment, it may require additional storage space to store the consistent on-disk checkpoint image. When the system becomes full and IOs are in danger of failing due to an out of space condition, it may be desirable to free up space reserved by checkpoint. The checkpoint is sacrificed to provide additional storage and prevent an out-of-space condition.

Embodiments of the presently described online system checkpoint alert and cleanup provide techniques for automatically detecting a potential out of space situation, and proactively notify and free up checkpoint storage space to ensure host IO success. Without effective out of space detection and handling, a user may run into an out of space issue with checkpoint activities which take up storage space. To ensure that the online system checkpoint feature does not bring adverse effects to system storage provisioning, an alert of a system low in space condition and alert handling mechanism provide a way to free up space. The automatic checkpoint alert and following clean up alleviate the concern of additional space usage by online system checkpoint, and minimize any out of space IO errors due to available system storage getting low.

In one embodiment, each data module maintains space usage counters 28 for each type of stripes, including normal and checkpoint stripes. The system management module monitors the in use, free, and checkpoint space counters in each data module. In one embodiment, free space is how much remaining space can be used for host writes. If IO writes to normal stripes, the free space is the remaining free storage in all types of normal stripes. If IO writes to checkpoint stripes, the free space is the remaining free storage in all types of checkpoint stripes. The in-use amount is the total free space subtracted from the total space minus.

In certain embodiments, the total space is the total available storage from RAID, and the total checkpoint space may be defined as the total available storage from checkpoint stripes. The system manager module calculates the system wide total space, in use space, and free space by aggregating worst case space usage from all data modules. The system management module calculates the checkpoint free space ratio by dividing the free space with the checkpoint total space, and triggers an alert if the checkpoint free space ratio runs low. The system management module triggers a checkpoint alert if either the checkpoint free space ratio is lower than a threshold value or if the overall system free space ratio is lower than system space threshold.

A checkpoint state machine starts alert handling by redirect 10 to normal stripes if needed. The checkpoint state machine will commit checkpoint stripes, which converts checkpoint stripes back to normal stripes, and delete the checkpoint snapshots to further free up space.

Figure 7:
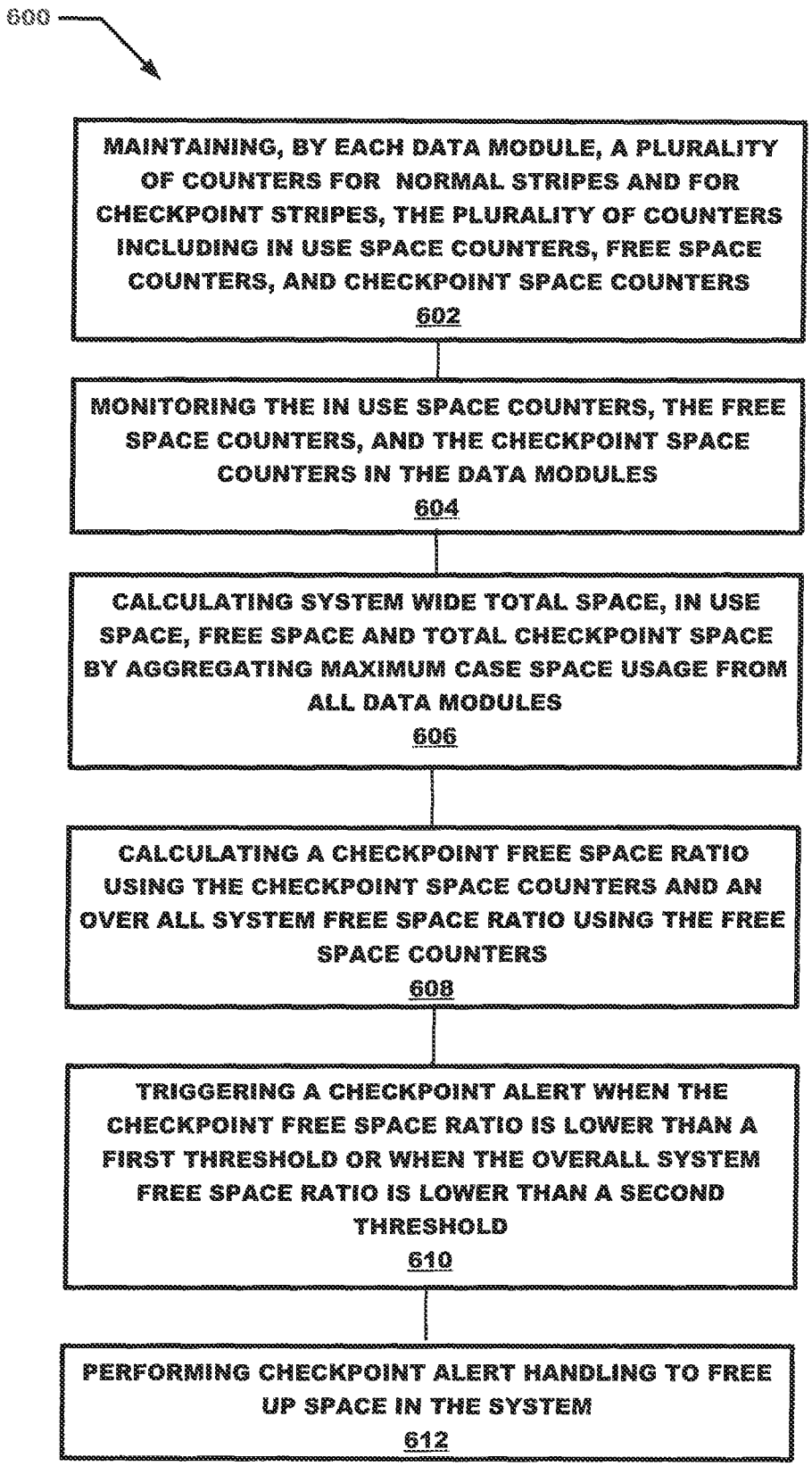
FIG. 7 depicts a flow chart of an illustrative process for an online checkpoint notification and handling in accordance with illustrative embodiments.
Figure 8:
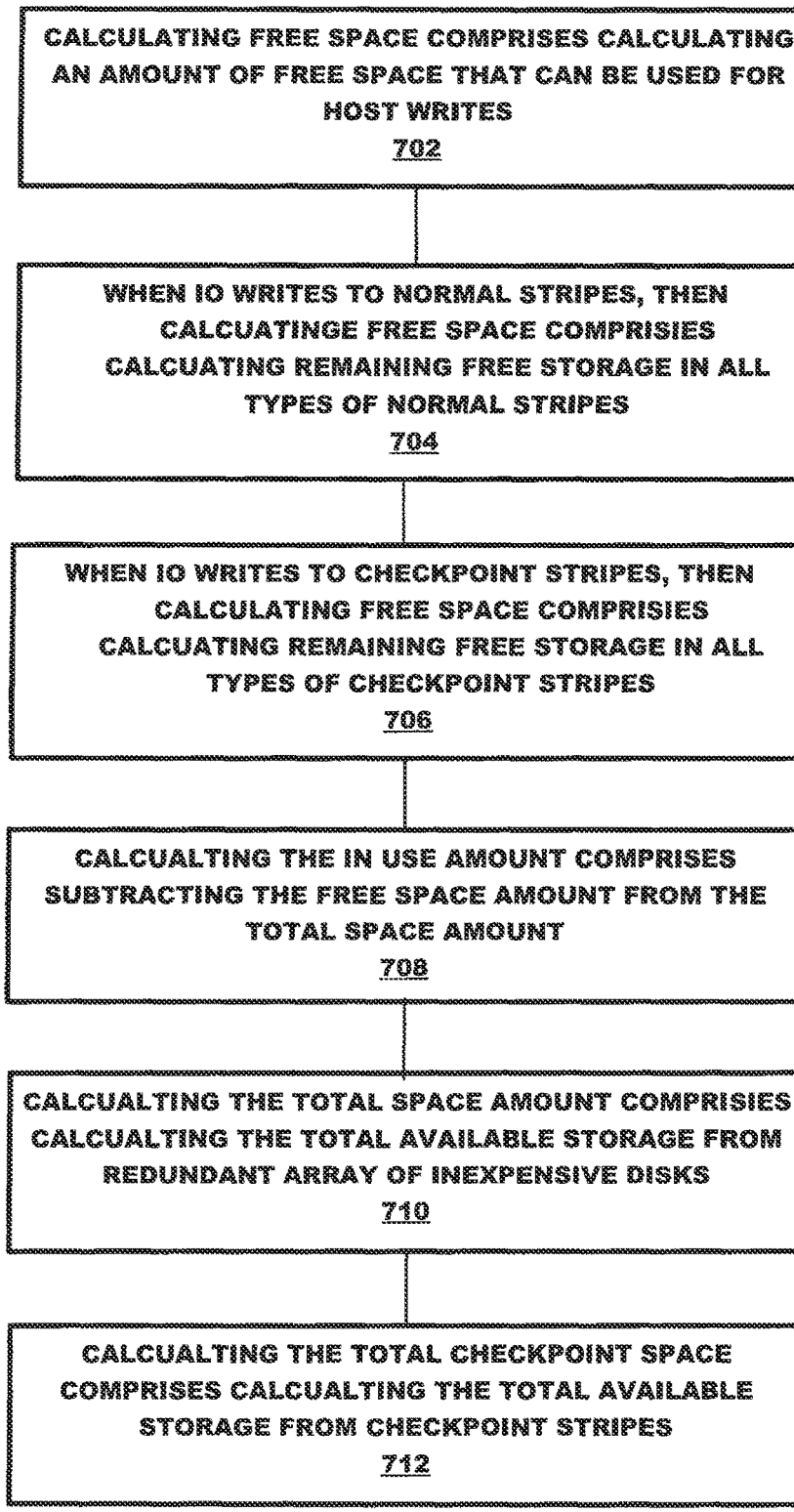
FIG. 8 depicts a flow chart of an illustrative process for calculating different storage values for use in the process of FIG. 7 in accordance with illustrative embodiments.
Figure 9:
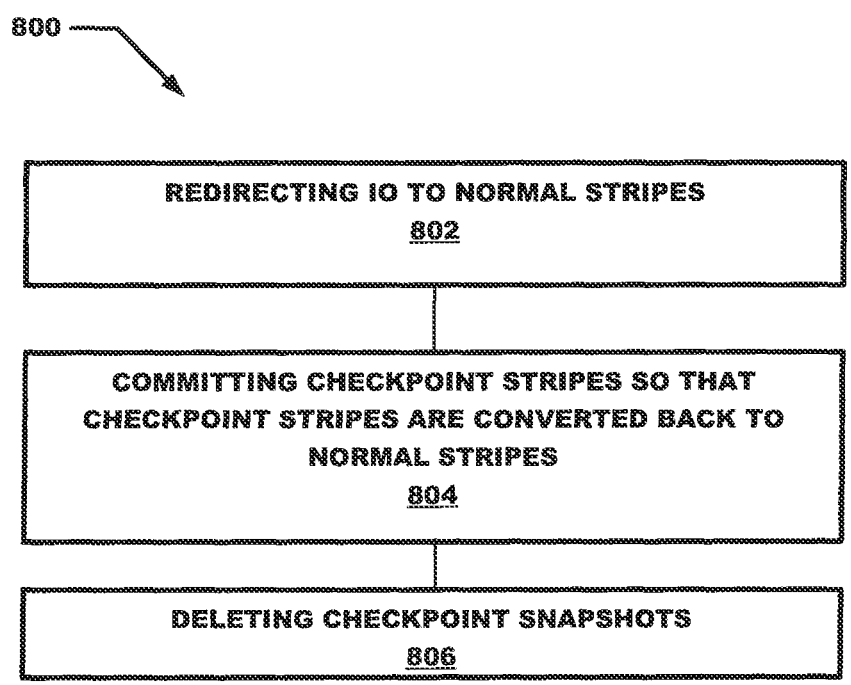
FIG. 9 depicts a flow chart of an illustrative process for handling a checkpoint notification in accordance with illustrative embodiments.

Referring now to FIGS. 7-9, example embodiments of a process for providing checkpoint alerts and alert handling are shown. As shown in FIG. 7, process 600 begins with processing block 602 which discloses maintaining, by each data module, a plurality of counters for normal stripes and for checkpoint stripes, the plurality of counters including in use space counters, free space counters, and checkpoint space counters. The space usage counters will be used to provide different calculations relating to the normal stripes and the checkpoint stripes and relating to disk space.

Processing block 604 shows monitoring the in use space counters, the free space counters, and the checkpoint space counters in each data module. These various counters may also be used to provide different calculations relating to disk space.

Processing block 606 recites calculating system wide total space, in use space, free space and checkpoint space by aggregating maximum case space usage from all data modules. The different values from each data module are aggregated to provide a system level accounting of disk space.

Processing block 608 recites calculating a checkpoint free space ratio using the checkpoint space counters and an overall system free space ratio using the free space counters. This provides a value of what percentage of space is available and if remedial action may need to be taken.

Processing block 610 discloses triggering a checkpoint alert when the checkpoint free space ratio is lower than a first threshold or when the overall system free space ratio is lower than a second threshold. When this alert happens, the system is in danger of encountering an out of space issue and having resulting IO errors.

Processing block 612 recites performing checkpoint alert handling to free up space in the system. By acting to free up space, IO error conditions may be avoided.

Referring now to FIG. 8, an example process 700 for calculating different free space values is shown. Process 700 begins with processing block 702 which discloses calculating free space comprises calculating an amount of free space that can be used for host writes.

Processing block 704 shows when IO writes are to normal stripes, then calculating an amount of free space comprises calculating the remaining free storage in all types of normal stripes. Processing block 706 discloses wherein when IO writes are to checkpoint stripes, the calculating an amount of free space comprises calculating the remaining free storage in all types of checkpoint stripes. The free space for either normal stripe or checkpoint stripes is calculated, dependent on which type of stripes are being written to.

Processing block 708 recites calculating the in use amount by subtracting the free space amount from the total space amount. Processing block 710 discloses calculating the total space amount comprises calculating the total available storage from Redundant Array of Inexpensive Disks (RAID). All the storage system disks are included as part of this calculation. As shown in processing block 712, calculating the total checkpoint space comprises calculating a total available storage from checkpoint stripes. Only the checkpoint stripes are included as part of the total checkpoint space determination.

Referring now to FIG. 9, an example embodiment of a process 800 for alert handling is shown. Process 800 begins with processing block 802 which discloses the performing checkpoint alert handling includes redirecting IO to normal stripes. Any new writes to checkpoint stripes are not permitted.

Processing block 804 shows wherein the performing checkpoint alert handling includes committing checkpoint stripes so that checkpoint stripes are converted back to normal stripes. After this step, there are no longer any checkpoint stripes.

Processing block 806 recites deleting checkpoint snapshots. The deleted snapshots free up additional storage space. As a result of the example process described with respect to FIG. 9, free space has been made available and processing can continue without encountering potential IO errors related to an out of space condition.

There is a desire to maintain volume data consistency by leveraging the advanced online snapshot technology and the capability of decoupling storage access object from storage data objects in modern storage arrays. During online checkpoint creation, the system creates consistent snapshots for all production volumes and consistent groups, and saves reference to host access attributes such as Small Computer System Interconnect (SCSI) identity of a production volume along with its snapshot. At recovery time, the system rolls back the content of production volumes to checkpoint creation time by re-assigning the host access identity to snapshot volumes.

In generating the checkpoint the system management module, goes through valid consistency groups and creates an online snapshot set for each one of them. The system management module then generates snapshots for each external volume that is not in a consistency group. If a volume is already part of a consistency group, there is no need to create checkpoint snapshot for itself, as it will get protected via the consistency group snapshot. The checkpoint snapshots are read-only and internal; their data content is immutable once created.

Each checkpoint snapshot set is marked with a unique checkpoint owner identifier. In addition, each snapshot set persists the object identifier attribute, which is the source consistency group or production volume external identifier, and may be used to re-assign volume identity later.

The control module background volume merge and delete are suspended so that snapshots and their ancestor backup and hash backup metadata stay intact. The control module performs an online journal destage to persist all hash backup metadata of snapshots and their ancestors on disk. The system management module takes a checkpoint copy of the volume configuration repository, so that it is protected from journal loss.

The consistency among volume configuration, volume data and metadata are preserved in the checkpoint. There may be multiple checkpoints, and the checkpoint owner identifier specifies which checkpoint the snapshot is a part of.

During checkpoint recovery, before all other data path modules start up, the system module starts and loads the checkpoint copy of system management module repository to in memory database. It then starts to recover volumes from checkpoint snapshots.

The system management module will go through the snapsets in the database. If a snapshot set is created for checkpoint with a matching checkpoint ID, the snapshot source volume objects are looked up based on the snapped object identifier attribute. Note that for a consistency group, a group of volumes are involved, a sort and match operation between snapshot set volume members and consistency group volume members may be performed.

Once checkpoint snapshot volumes are matched with the original source volumes, the snapshot volumes are re-assigned the external identifier of the source volumes, and those source volumes that lost the identify during recovery are deleted from the database. Alternatively, a snapshot of the checkpoint snapshot is made, and then the source volume identifier can be assigned to the snapshot of the snapshot. The benefit of doing the latter way is that recovery can be performed multiple times if needed, as long as data path metadata hasn't been overwritten.

Once the system management module completes volume recovery based on snapshots, it can then start the recovery of the data module, the control module, and the routing module.

The data module recovers on disk logical volume data and metadata. The control module rebuilds in memory the logical volume metadata after data module recovery is complete. Note that the original production volume configuration is not sent to the control module during recovery, so that the control module will not try to load potentially corrupted volume metadata.

The routing module gets updated mapping between identifier logical unit and the logical volume recovered from checkpoint snapshot volumes underneath. When the host starts to access volumes, it sees the data content of volumes at the time when the checkpoint was created. Once all the routing modules, data modules and control modules in the data path are activated, the system can start serving host application IOs.

Snapshot clean up may be performed when the checkpoint is no longer needed. The checkpoint state machine goes through all the snapshot sets in the database, find the ones generated for the checkpoint with a matching checkpoint identifier, and deletes them.

Figure 10:
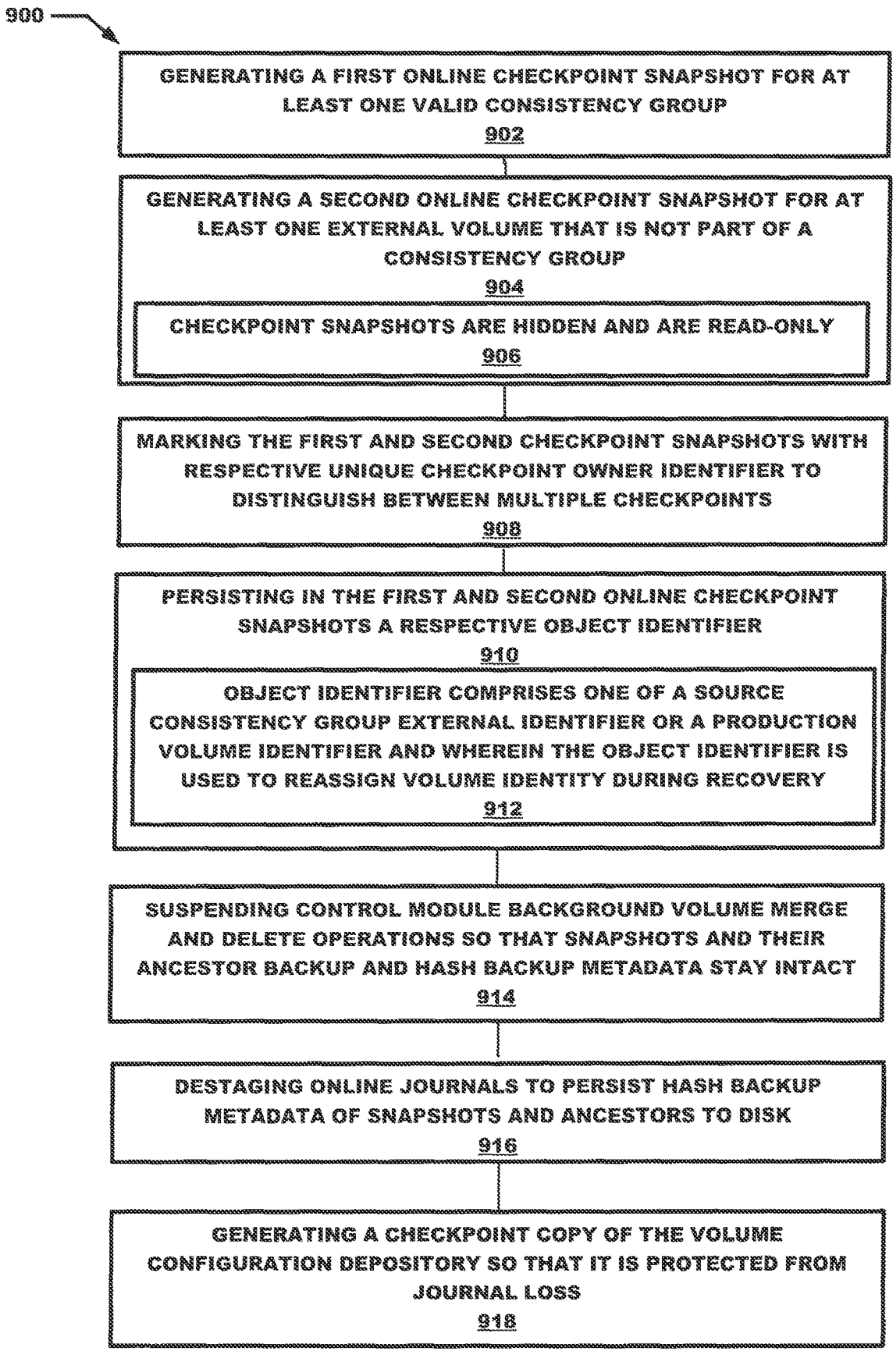
FIG. 10 depicts a flow chart for maintaining volume data consistency for a checkpoint in accordance with illustrative embodiments.

Referring now to FIG. 10, an example method 900 for ensuring volume consistency for an online system checkpoint is shown. Method 900 begins with processing block 902 which discloses generating a first online checkpoint snapshot for at least one valid consistency group.

Processing block 904 shows generating a second online checkpoint snapshot for at least one external volume that is not part of a consistency group. As shown in processing block 906 checkpoint snapshots for both consistency groups and individual volumes are hidden and are read-only. Once the checkpoint snapshots have been generated, they cannot be modified.

Processing block 908 recites marking the first and second checkpoint snapshots with respective unique checkpoint owner identifier to distinguish between multiple checkpoints. There may be multiple checkpoints, all generated at different times, to provide different sets of known good state to recover from.

Processing block 910 discloses persisting in the first and second checkpoint snapshot an object identifier. As shown in processing block 912, the object identifier comprises one of a source consistency group external identifier or a production volume identifier and wherein the object identifier is used to reassign volume identity during recovery.

Processing block 914 shows suspending control module background volume merge and delete operations so that snapshots and their ancestor backup and hash backup metadata stay intact during checkpoint generation. Processing block 916 recites destaging online journals to persist hash backup metadata of snapshots and ancestors to disk. Processing block 918 discloses generating a checkpoint copy of a volume configuration repository so that it is protected from journal loss.

Figure 11:
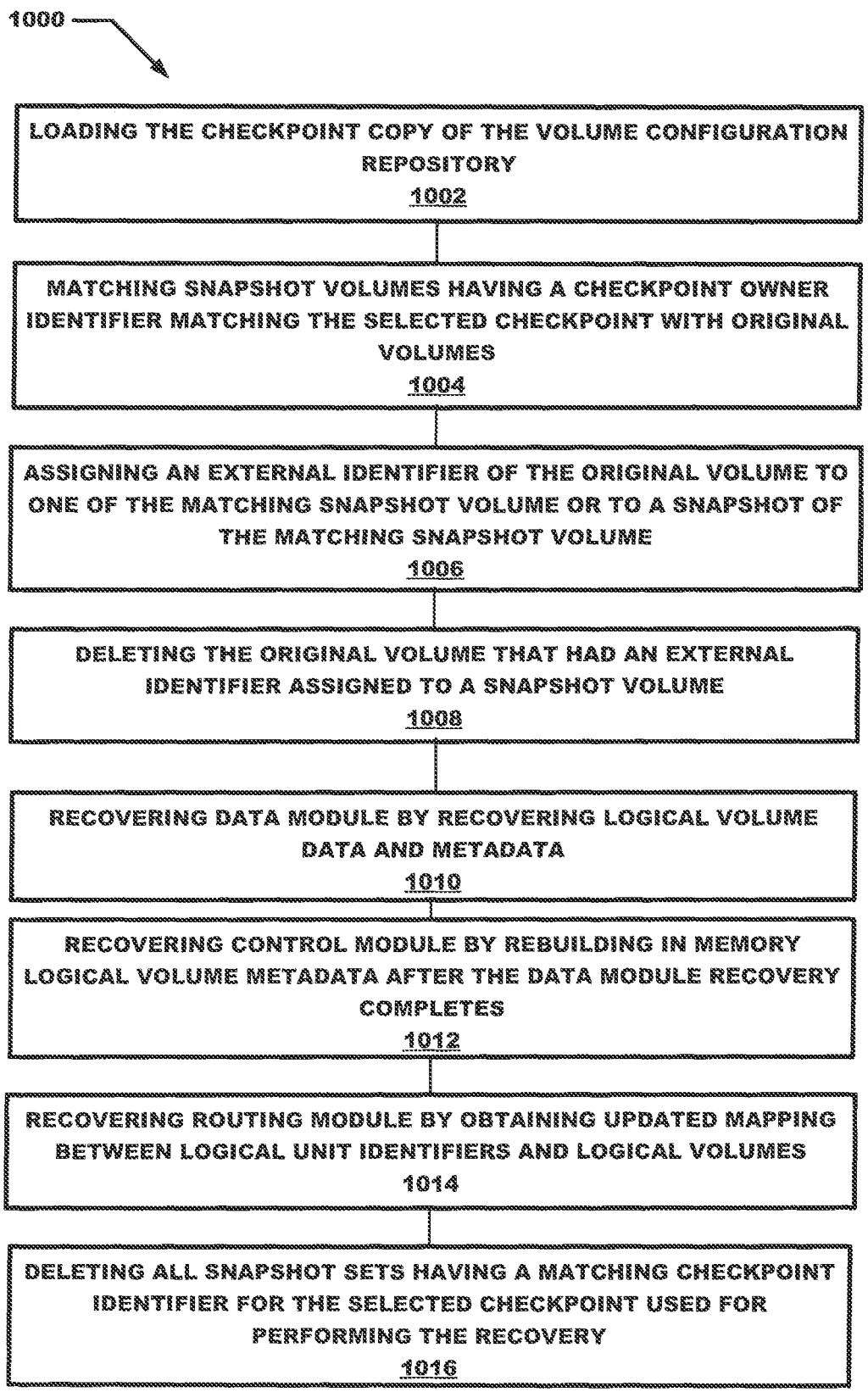
FIG. 11 depicts a flow diagram for volume recovery in accordance with illustrative embodiments.

Referring now to FIG. 11, an exemplary method 1000 for performing volume recovery is shown. Method 1000 begins with processing block 1002 which discloses loading the checkpoint copy of the volume configuration repository.

Processing block 1004 shows matching snapshot volumes having a checkpoint owner identifier matching the selected checkpoint with original volumes. Processing block 1006 discloses assigning an external identifier of the original volume to one of the matching snapshot volume or to a snapshot of the matching snapshot volume. Processing block 1008 shows deleting the original volume that had an external identifier assigned to a snapshot volume.

Processing block 1010 discloses recovering the data module which involves recovering logical volume data and metadata. Processing block 1012 shows recovering the control module by rebuilding the in memory logical volume metadata after the data module recovery completes. Processing block 1014 recites recovering the routing module by obtaining updated mapping between logical unit identifiers and logical volumes.

Once the volumes have been recovered along with the data module, the control module and the routing module, as shown in processing block 1016 all snapshot sets having a matching checkpoint identifier for the selected checkpoint used for performing the recovery are deleted.

Figure 12:
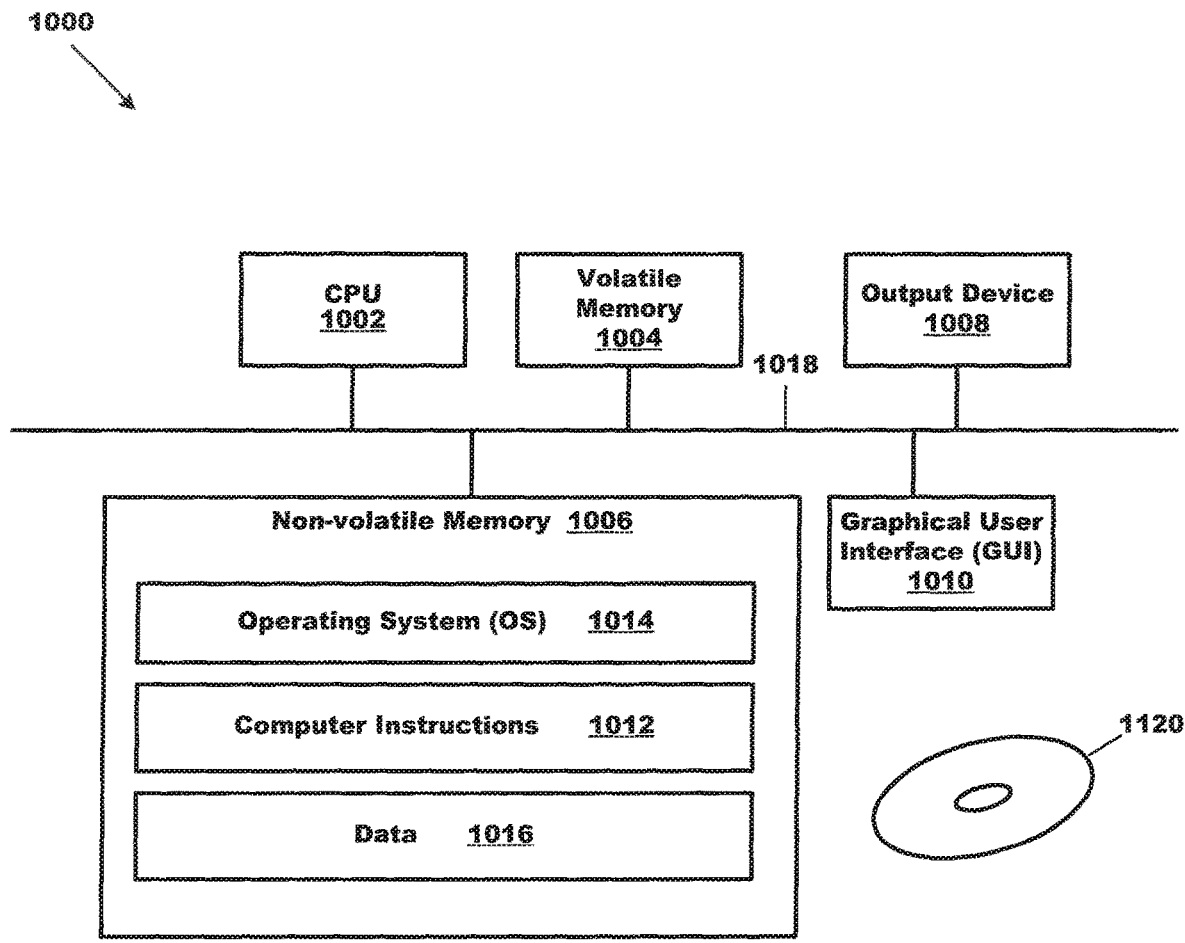
FIG. 12 is a block diagram of an example of a hardware device that may perform at least a portion of the processes depicted in the flow charts.

The processes described herein are not limited to use with the hardware and software of FIG. 12 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, the processes are not limited to the specific processing order shown in the flow diagrams. Rather, any of the blocks of the processes may be re-ordered, combined or removed, performed in parallel or in serial, as necessary, to achieve the results set forth herein.

The processor 1102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

In some described embodiments, hosts 104 of FIG. 1 may each correspond to one computer, a plurality of computers, or a network of distributed computers. For example, in some embodiments, the computers may be implemented as one or more computers such as shown in FIG. 12. As shown in FIG. 12, computer 1100 may include processor 1102, volatile memory 1104 (e.g., RAM), non-volatile memory 1106 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1110 (e.g., a touchscreen, a display, and so forth) and output device 1108 (e.g., a mouse, a keyboard, etc.). Non-volatile memory 1106 stores computer instructions 1112, an operating system 1114 and data 1116 such that, for example, the computer instructions 1112 are executed by the processor 1102 out of volatile memory 1104 to perform at least a portion of the processes described herein. Program code may be applied to data entered using an input device of GUI 1110 or received from I/O device 420.

The processes described herein are not limited to use with the hardware and software of FIG. 12 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, the processes are not limited to the specific processing order shown in FIGS. 3 and 4. Rather, any of the blocks of the processes may be re-ordered, combined or removed, performed in parallel or in serial, as necessary, to achieve the results set forth herein.

Processor 1102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

As described above, the present method and apparatus for providing an online consistent system checkpoint, a user can proactively generate a consistent system checkpoint without interruption to host IO. When a system failure occurs and the system fails to boot up, a user could instruct system to start from a previous online consistent system checkpoint with a single command. The system will in turn load the checkpointed configuration, metadata and data, and recover the system to a known good state (when the checkpoint was created).

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
    generating a checkpoint for a storage system containing an image for a point in time for the storage system;
    storing, in a reserved area of the storage location, volume configuration data corresponding to volumes for the point in time, a plurality of layers of metadata for the point in time, and physical data for the point in time;
    creating consistent snapshots for the volumes;
    destaging a control module journal and persisting a control module hash tree and dirty tree metadata;
    destaging a user defined code cache, dumping hash metadata and physical layout metadata to a separate location in the storage system and enabling new metadata updates to a default location;
    redirecting the new data and metadata input/outputs (IOs) to stripes reserved during preparation of the separate location relating to the checkpoint and protecting checkpointed data and metadata; and
    generating a consistent checkpoint copy of a system management module repository in the reserved area of storage.

2. The method of claim 1, further comprising:
    maintaining checkpoint consistency using a checkpoint object when a checkpoint generation operation begins;
    maintaining logical volume consistency using a source object identifier, the source object identifier persisted in the checkpoint object;
    maintaining harvested metadata and physical layout metadata consistency by persisting physical layout offsets of the harvested metadata and the physical layout metadata for discovery during checkpoint recovery using the checkpoint object; and
    maintaining disk management database copy consistency using a persistent flag in a system management module metadata record indicating a checkpoint copy of the system management module repository was successfully generated and stored for use in checkpoint recovery using the checkpoint object.

3. The method of claim 2, wherein maintaining the checkpoint consistency using the checkpoint object comprises:
    generating the checkpoint object when checkpoint preparation is initiated; and
    persisting a checkpoint unique identifier and state machine attributes in the checkpoint object.

4. The method of claim 2, wherein maintaining the logical volume consistency using the source object identifier includes:
    marking each checkpoint snapshot set with a unique checkpoint owner identifier;
    persisting the checkpoint owner identifier for each checkpoint snapshot set; and
    using the checkpoint owner identifier to reassign volume identity during checkpoint recovery.

5. The method of claim 2, further comprising performing the checkpoint recovery, comprising:
    receiving a request to recover a system management module process from a checkpoint;
    updating a system management module initialization parameter file by setting a flag to start from the checkpoint;
    starting a new system management module process with the updated initialization parameter;
    loading a checkpoint copy of the system management module repository;
    recovering volumes from checkpoint snapshots before any data path module activation;
    activating data modules with checkpoint metadata offset information and reformatting data module journals;
    activating control modules with recovered volume configuration and reformatting control module journals;
    setting defragmentation mode to rollback mode and deleting data on checkpoint stripes that were written after checkpoint creation and waiting for defragmentation rollback to complete;
    setting host Input Output (IO) direction to checkpoint stripes;
    activating routing modules and allowing host IO operations; and
    upon successful system activation, marking checkpoint recovery complete and resetting the flag in the platform.

6. The method of claim 5 wherein the loading checkpoint copy of system management module repository further comprises loading system management module metadata first.

7. The method of claim 5 wherein said loading a checkpoint copy of system management module repository further comprises:
    loading a checkpoint system management module management object database data base and reconstructing in memory object database based on checkpoint;
    reformatting journal chunks and discarding left over journals after checkpoint generation; and
    mounting on-disk RAID 1.3 section and dumping in-memory system management module repository to default RAID 1.3 location.

8. The method of claim 5 wherein:
    activating data modules with checkpoint offset information and reformatting data module journals further comprises using the data module to recover harvested metadata/physical layout metadata and user data from hardened checkpoint copy in normal data stripes, and waiting for harvested meta data recovery to complete;

activating control modules with recovered volume configuration and reformatting control module journals further comprises using the control module to load hash backup metadata based on recovered data module data content; and using the control module to reconstruct an address to hash mapping table in memory hash tree and dirty tree for recovered volumes.

9. A system comprising:

a processor; and memory storing computer program code that when executed on the processor causes the processor to operate a storage system, the storage system operable to perform the operations of:

generating a checkpoint for a storage system containing an image for a point in time for the storage system;

storing, in a reserved area of the storage location, volume configuration data corresponding to volumes for the point in time, a plurality of layers of metadata for the point in time, and physical data for the point in time;

creating consistent snapshots for the volumes;

destaging a control module journal and persisting a control module hash tree and dirty tree metadata;

destaging a user defined code cache, dumping hash metadata and physical layout metadata to a separate location in the storage system and enabling new metadata updates to a default location;

redirecting the new data and metadata input/outputs (IOs) to stripes reserved during preparation of the separate location relating to the checkpoint and protecting checkpointed data and metadata; and generating a consistent checkpoint copy of a system management module repository in the reserved area of storage.

10. The system of claim 9, wherein the operations further comprise:

maintaining checkpoint consistency using a checkpoint object when a checkpoint generation operation begins;

maintaining logical volume consistency using a source object identifier, the source object identifier persisted in the checkpoint object;

maintaining harvested metadata and physical layout metadata consistency by persisting physical layout offsets of the harvested metadata and the physical layout metadata for discovery during checkpoint recovery using the checkpoint object; and maintaining disk management database copy consistency using a persistent flag in a system management module metadata record indicating a checkpoint copy of the system management module repository was successfully generated and stored for use in checkpoint recovery using the checkpoint object.

11. The system of claim 10, wherein maintaining the checkpoint consistency using the checkpoint object comprises:

generating the checkpoint object when checkpoint preparation is initiated; and persisting a checkpoint unique identifier and state machine attributes in the checkpoint object.

12. The system of claim 10, wherein maintaining the logical volume consistency using the source object identifier includes:

marking each checkpoint snapshot set with a unique checkpoint owner identifier;

persisting the checkpoint owner identifier for each checkpoint snapshot set; and using the checkpoint owner identifier to reassign volume identity during checkpoint recovery.

13. The system of claim 10, wherein the operations further comprise performing the checkpoint recovery, comprising:

receiving a request to recover a system management module process from a checkpoint;

updating a system management module initialization parameter file by setting a flag to start from the checkpoint;

starting a new system management module process with the updated initialization parameter;

loading a checkpoint copy of the system management module repository;

recovering volumes from checkpoint snapshots before any data path module activation;

activating data modules with checkpoint metadata offset information and reformatting data module journals;

activating control modules with recovered volume configuration and reformatting control module journals;

setting defragmentation mode to rollback mode and deleting data on checkpoint stripes that were written after checkpoint creation and waiting for defragmentation rollback to complete;

setting host Input Output (IO) direction to checkpoint stripes;

activating routing modules and allowing host IO operations; and upon successful system activation, marking checkpoint recovery complete and resetting the flag in the platform.

14. The system of claim 13 wherein the loading checkpoint copy of system management module repository further comprises loading system management module metadata first.

15. The system of claim 13 wherein the loading a checkpoint copy of system management module repository further comprises:

loading a checkpoint system management module management object database data base and reconstructing in memory object database based on checkpoint;

reformatting journal chunks and discarding left over journals after checkpoint generation; and mounting on-disk RAID 1.3 section and dumping in-memory system management module repository to default RAID 1.3 location.

16. The system of claim 13 wherein:

activating data modules with checkpoint offset information and reformatting data module journals further comprises using the data module to recover harvested metadata/physical layout metadata and user data from hardened checkpoint copy in normal data stripes, and waiting for harvested meta data recovery to complete;

activating control modules with recovered volume configuration and reformatting control module journals further comprises using the control module to load hash backup metadata based on recovered data module data content; and using the control module to reconstruct an address to hash mapping table in memory hash tree and dirty tree for recovered volumes.

17. A computer program product including a non-transitory computer readable storage medium having computer program code encoded thereon that when executed on a processor of a computer causes the computer to operate a storage system, the computer program product performing operations, comprising:

generating a checkpoint for a storage system containing an image for a point in time for the storage system;

storing, in a reserved area of the storage location, volume configuration data corresponding to volumes for the point in time, a plurality of layers of metadata for the point in time, and physical data for the point in time;

creating consistent snapshots for the volumes;

destaging a control module journal and persisting a control module hash tree and dirty tree metadata;

destaging a user defined code cache, dumping hash metadata and physical layout metadata to a separate location in the storage system and enabling new metadata updates to a default location;

redirecting the new data and metadata input/outputs (IOs) to stripes reserved during preparation of the separate location relating to the checkpoint and protecting checkpointed data and metadata; and generating a consistent checkpoint copy of a system management module repository in the reserved area of storage.

18. The computer program product of claim 17, wherein the operations further comprise:

maintaining checkpoint consistency using a checkpoint object when a checkpoint generation operation begins;

maintaining logical volume consistency using a source object identifier, the source object identifier persisted in the checkpoint object;

maintaining harvested metadata and physical layout metadata consistency by persisting physical layout offsets of the harvested metadata and the physical layout metadata for discovery during checkpoint recovery using the checkpoint object; and maintaining disk management database copy consistency using a persistent flag in a system management module metadata record indicating a checkpoint copy of the system management module repository was successfully generated and stored for use in checkpoint recovery using the checkpoint object.

19. The computer program product of claim 18, wherein maintaining the checkpoint consistency using the checkpoint object comprises:

generating the checkpoint object when checkpoint preparation is initiated; and persisting a checkpoint unique identifier and state machine attributes in the checkpoint object.

20. The computer program product of claim 18, wherein maintaining the logical volume consistency using the source object identifier includes:

marking each checkpoint snapshot set with a unique checkpoint owner identifier;

persisting the checkpoint owner identifier for each checkpoint snapshot set; and using the checkpoint owner identifier to reassign volume identity during checkpoint recovery;

wherein the operations further comprise performing the checkpoint recovery, comprising:

receiving a request to recover a system management module process from a checkpoint;

updating a system management module initialization parameter file by setting a flag to start from the checkpoint;

starting a new system management module process with the updated initialization parameter;

loading a checkpoint copy of the system management module repository;

recovering volumes from checkpoint snapshots before any data path module activation;

activating data modules with checkpoint metadata offset information and reformatting data module journals;

activating control modules with recovered volume configuration and reformatting control module journals;

setting defragmentation mode to rollback mode and deleting data on checkpoint stripes that were written after checkpoint creation and waiting for defragmentation rollback to complete;

setting host Input Output (IO) direction to checkpoint stripes;

activating routing modules and allowing host IO operations; and upon successful system activation, marking checkpoint recovery complete and resetting the flag in the platform.

* * * * *